United States Patent
Beaujot

(10) Patent No.: US 12,035,645 B2
(45) Date of Patent: *Jul. 16, 2024

(54) IMPLEMENT SUPPORT APPARATUS WITH ADJUSTABLE WIDTH

(71) Applicant: SeedMaster Manufacturing Ltd., Emerald Park (CA)

(72) Inventor: Norbert Beaujot, Emerald Park (CA)

(73) Assignee: SeedMaster Manufacturing Ltd., Saskatchewan (CA)

( * ) Notice: Subject to any disclaimer, the term of this patent is extended or adjusted under 35 U.S.C. 154(b) by 111 days.

This patent is subject to a terminal disclaimer.

(21) Appl. No.: 17/719,493

(22) Filed: Apr. 13, 2022

(65) Prior Publication Data

US 2022/0232749 A1 Jul. 28, 2022

Related U.S. Application Data

(63) Continuation of application No. 16/861,712, filed on Apr. 29, 2020, now Pat. No. 11,317,554.

(30) Foreign Application Priority Data

Feb. 24, 2020 (CA) .................. CA 3073428

(51) Int. Cl.
*B60D 1/46* (2006.01)
*A01B 51/04* (2006.01)
(Continued)

(52) U.S. Cl.
CPC ............ *A01B 51/04* (2013.01); *B60D 1/46* (2013.01); *B60P 1/52* (2013.01); *B62D 21/14* (2013.01);
(Continued)

(58) Field of Classification Search
CPC .... A01B 51/04; B60D 1/46; B60D 2001/008; B60P 1/52; B60P 1/025; B62D 21/14; B62D 21/20; B62D 55/06; B62D 63/062
See application file for complete search history.

(56) References Cited

U.S. PATENT DOCUMENTS 3,369,684 A 2/1968 Ford
3,910,435 A 10/1975 Haag
(Continued)

FOREIGN PATENT DOCUMENTS

DE 20201001523 U1 1/2020
GB 1450586 9/1976
(Continued)

OTHER PUBLICATIONS

U.S. Appl. No. 16/861,712, filed Apr. 29, 2020; Beaujot.

*Primary Examiner* — Minnah L Seoh
*Assistant Examiner* — Marlon A Arce
(74) *Attorney, Agent, or Firm* — Nixon & Vanderhye P.C.

(57) ABSTRACT

A U-shaped support frame has a base beam and parallel side beams extending rearward from the base beam and defining an open implement area, which can be made adjustable. A hitch is attached to the front end of the support frame and frame wheels support the side beams, and rotate about a horizontal frame wheel axis that is fixed in an orientation perpendicular to the operating travel direction. Implements are configured to perform an implement operation and to rest on the ground surface when in an idle position. The support frame is moved rearward to a loading position where each implement is movable to an operating position supported by the support frame. Each implement provides a beam lock connection between the side beams that resists twisting (Continued)

movement of the side beams to maintain the frame wheels and the side beams in a substantially fixed relationship with respect to each other.

15 Claims, 16 Drawing Sheets

(51) Int. Cl.
  *B60P 1/52*   (2006.01)
  *B62D 21/14*   (2006.01)
  *B62D 21/20*   (2006.01)
  *B62D 55/06*   (2006.01)
  *B62D 63/06*   (2006.01)
  *B60D 1/00*   (2006.01)

(52) U.S. Cl.
  CPC ............ *B62D 21/20* (2013.01); *B62D 55/06* (2013.01); *B62D 63/062* (2013.01); *B60D 2001/008* (2013.01)

(56) References Cited

U.S. PATENT DOCUMENTS

| | | | | |
|---|---|---|---|---|
| 3,958,707 A | * | 5/1976 | Deppe | B60P 1/025 |
| | | | | 414/458 |
| 4,155,471 A | | 5/1979 | Yancy | |
| 4,673,328 A | * | 6/1987 | Shiels | B60P 1/025 |
| | | | | 414/559 |
| 5,536,131 A | * | 7/1996 | Behr | B60P 1/025 |
| | | | | 296/25 |
| 5,879,122 A | * | 3/1999 | Voelzke | B60P 1/025 |
| | | | | 254/1 OR |
| 7,455,312 B2 | | 11/2008 | Senatore | |
| 8,342,785 B1 | | 1/2013 | Ingles | |
| 9,630,545 B1 | | 4/2017 | Corrigan | |
| 10,449,886 B2 | | 10/2019 | Richardson | |
| 10,479,256 B2 | * | 11/2019 | Rezvanian | B60P 1/6445 |
| 2005/0220591 A1 | | 10/2005 | Doskocil | |
| 2008/0253872 A1 | * | 10/2008 | Tollefson | B60P 1/025 |
| | | | | 414/458 |
| 2013/0315696 A1 | | 11/2013 | Jones | |
| 2017/0274945 A1 | * | 9/2017 | Tran | B62D 63/064 |
| 2017/0297471 A1 | | 10/2017 | Beaujot | |
| 2019/0053417 A1 | | 2/2019 | Beaujot | |
| 2021/0155146 A1 | | 5/2021 | Yabushita | |
| 2021/0259146 A1 | | 8/2021 | Beaujot | |

FOREIGN PATENT DOCUMENTS

| | | |
|---|---|---|
| GB | 2316932 A | 3/2011 |
| JP | S58-49530 | 3/1983 |

* cited by examiner

IMPLEMENT SUPPORT APPARATUS WITH ADJUSTABLE WIDTH

This application is a Continuation of U.S. application Ser. No. 16/861,712, filed Apr. 29, 2020, which claims priority to CA 3073428, filed on Feb. 24, 2020, the entire contents of which are all hereby incorporated herein by reference in their entireties.

This disclosure relates to the field of implements for use in industries such as agriculture, mining, construction and the like, and in particular to an implement support apparatus with a frame and wheels to carry a variety of implements.

BACKGROUND

Implements such as are used in agriculture and various industries such as mining, road construction and maintenance, and the like include a wide variety of sizes and configurations. Implements such as combines, swathers, sprayers, road graders, earth movers, and the like are commonly self-propelled, with the engine, drive system, and operators station incorporated into the implement itself. Implements such as air seeders, cultivators, discs, grain carts, mowers, and the like are more commonly towed behind a tractor. Some implements are configured to be mounted directly on a tractor instead of being towed behind, such as snowplows mounted on the front end of a tractor, mowers mounted under a middle portion of the tractor, and a wide variety of implements mounted to the arms of a three point hitch system commonly incorporated on the rear end of tractors.

A typical towed implement comprises a frame mounted on wheels, and hitch attached to the frame and adapted to be connected to a towing vehicle like a tractor. In some such implements earth working tools such as furrow openers, shanks, blades, buckets or the like are mounted on the frame. Implement controls are provided connecting the tools to hydraulic and or electric power sources, typically on the towing vehicle, so that an operator on the towing vehicle can control the functions of the implement. It is also common to incorporate automatic controls, where implement functions are controlled automatically according to the location determined by a global positioning system (GPS) or the like.

Other implements may comprise a container mounted on the frame for carrying granular material such as grain, fertilizer, soil, etc. or for carrying liquids. The implements can include spreaders for granular material or sprayer booms for and pumps for spraying liquids. The variety of implements used in agriculture, construction, and the like is large and varied, however a frame mounted on wheels is common to many of these towed implements.

United States Published Patent Application Number 2019/0053417 of the present inventor Beaujot discloses an implement operating apparatus with a U-shaped support frame supported on drive wheels, each pivotally mounted about a vertical wheel pivot axis. Various implements are configured to perform various operations and can be connected to the drive frame. The drive frame and implement move and steer along a first travel path or a second travel path oriented generally perpendicular to the first travel path.

SUMMARY OF THE INVENTION

The present disclosure provides an implement support frame and hitch mounted on wheels that overcomes problems in the prior art.

In a first embodiment the present disclosure provides an implement support apparatus comprising a U-shaped support frame comprising a base beam and right and left substantially parallel side beams extending rearward from corresponding right and left portions of the base beam and defining an open implement area between the right and left side beams. A hitch assembly is attached at a rear end thereof to a front end of the support frame and is adapted at a front end thereof for connection to a towing vehicle. Right and left frame wheels are mounted to the corresponding right and left side beams and support the right and left side beams, and each frame wheel is rotatable about a frame wheel axis that is fixed in a substantially horizontal orientation perpendicular to an operating travel direction that is substantially aligned with the right and left side beams.

First and second implements are each configured to perform an implement operation and to rest on the ground surface when in an idle position. The first and second implements and the support frame are configured such that when each implement is in the idle position, the support frame is movable, when connected to and propelled by the towing vehicle, rearward with respect to each implement to an implement loading position where each implement is connectable to the support frame and is movable to an operating position where each implement is supported by the support frame and is connectable to an implement control system operative to control implement functions. Each of the first and second implements provides a beam lock connection between the right and left side beams and when each of the first and second implements is in the operating position, the beam lock connection resists twisting movement of the right and left side beams to maintain the right and left frame wheels and the right and left side beams in a substantially fixed relationship with respect to each other.

In a second embodiment the present disclosure provides an implement support apparatus comprising a U-shaped support frame comprising a base beam and right and left substantially parallel side beams extending rearward and sloping downward from corresponding right and left portions of the base beam and defining an open implement area between the right and left side beams. A hitch assembly is attached at a rear end thereof to the support frame and is adapted at a front end thereof for connection to a towing vehicle. Right and left frame wheels are mounted to the corresponding right and left side beams and support the right and left side beams, and each frame wheel is rotatable about a corresponding frame wheel axis that is fixed in a substantially horizontal orientation perpendicular to an operating travel direction that is substantially aligned with the right and left side beams. First and second implements are each configured to perform an implement operation and to rest on the ground surface when in an idle position. The first and second implements comprise a front implement load support and right and left rear implement load supports. The first and second implements and the support frame are configured such that when each implement is in the idle position, the support frame is movable, when connected to and propelled by the towing vehicle, rearward with respect to each implement to an implement loading position where each implement is connectable to the support frame and is movable to an operating position where each implement is supported on the front implement load support and on the right and left rear implement load supports by a corresponding front bearing member mounted to the support frame and corresponding right and left rear bearing members attached to the corresponding right and left side beams and where each implement is connectable to an implement control system operative to control implement functions.

In a third embodiment the present disclosure provides an implement support apparatus comprising a U-shaped support frame comprising a base beam and right and left substantially parallel side beams extending rearward from corresponding right and left portions of the base beam and defining an open implement area between the right and left side beams, and wherein a width of the open implement area between the right and left side beams is adjustable. A hitch assembly is attached at a rear end thereof to a front end of the support frame and is adapted at a front end thereof for connection to a towing vehicle. Right and left frame wheels are mounted to the corresponding right and left side beams and support the right and left side beams. Each frame wheel is rotatable about a frame wheel axis that is fixed in a substantially horizontal orientation perpendicular to an operating travel direction that is substantially aligned with the right and left side beams. First and second implements are each configured to perform an implement operation and to rest on the ground surface when in an idle position. The first and second implements and the support frame are configured such that when each implement is in the idle position, the support frame is movable, when connected to and propelled by the towing vehicle, rearward with respect to each implement to an implement loading position where each implement is connectable to the support frame and is movable to an operating position where each implement is supported by the support frame and is connectable to an implement control system operative to control implement functions. The width of the open implement area is adjusted to a first width to support the first implement and the width of the open implement area is adjusted to a second width to support the second implement.

The present disclosure provides an implement support frame mounted on frame wheels. The implement frame includes a hitch assembly and is towed along a length wise path aligned with the side beams. Implements of different configurations can be manufactured without a frame, hitch, and wheels, and then installed on the support frame. Heavy implements can be carried by the implement support apparatus because it is configured to resist torque forces caused by implement weights that are off set from the support frame wheel paths and also caused by turning and by sloping ground. The frame wheels rotate about rotational axes that are rigidly fixed to the side beams of the support frame.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
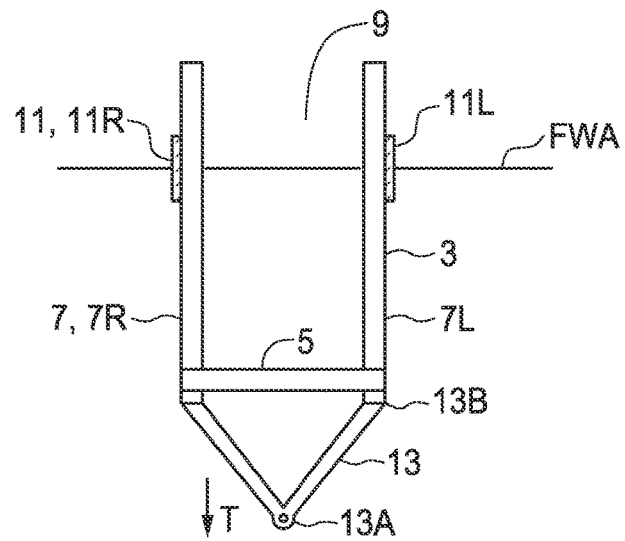
FIG. 1 is a schematic top view of a support frame of the implement operating apparatus of the present disclosure.
Figure 2:
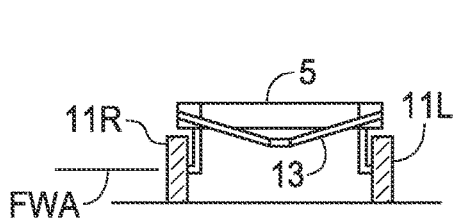
FIG. 2 is a schematic front view of the support frame of FIG. 1.
Figure 3:
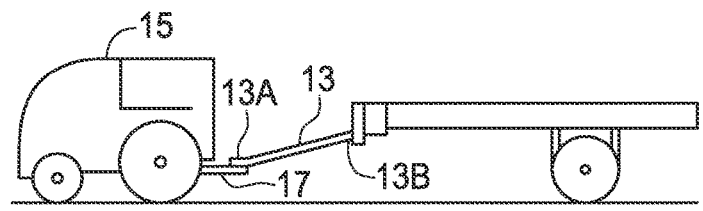
FIG. 3 is a schematic side view of the support frame of FIG. 1 connected to a towing vehicle.

FIGS. 1-4 schematically illustrate an embodiment of an implement support apparatus 1 of the present disclosure. The apparatus 1 comprises a U-shaped support frame 3 comprising a base beam 5 and right and left substantially parallel side beams 7R, 7L extending rearward from corresponding right and left portions of the base beam 5 and defining an open implement area 9 between the right and left side beams 7R, 7L.

Right and left frame wheels 11R, 11L are mounted to the corresponding right and left side beams 7R, 7L and support the right and left side beams. Each frame wheel 11 is rotatable about a frame wheel axis FWA that is fixed in a substantially horizontal orientation perpendicular to an operating travel direction T that is substantially aligned with the right and left side beams 7.

A hitch assembly 13 is attached at a rear end 13B thereof to a front end of the support frame 3 and is adapted at a front end 13A thereof for connection to a towing vehicle 15. The illustrated hitch assembly 13 is fixed to the base beam 5 such that a front portion of the weight of the support frame 3 and any implement supported thereon is supported on the hitch 17 of the towing vehicle 15 and a rear portion of the weight of the support frame 3 and any implement supported thereon is supported on the frame wheels 11.

Figure 4:
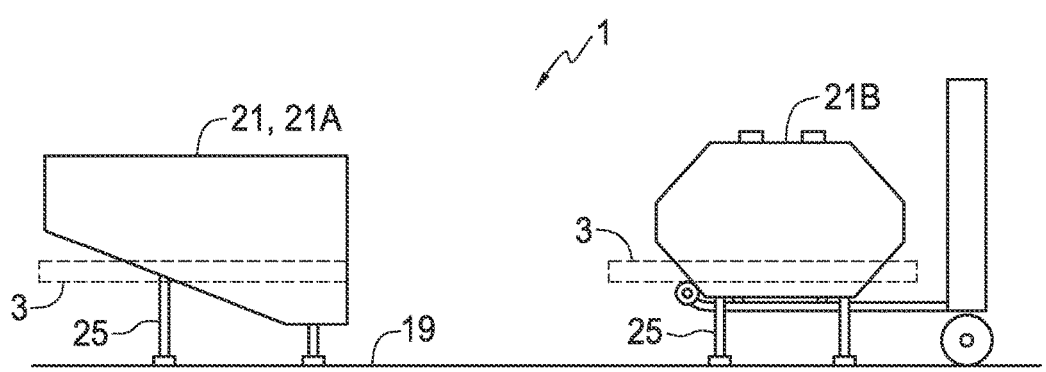
FIG. 4 is a schematic side view of first and second implements of the implement operating apparatus for mounting on the support frame of FIG. 1.

First and second implements 21A, 21B are each configured to perform an implement operation and to rest on the ground surface 19 when in the illustrated idle position. The implements 21 can include a wide variety of implements that might be used in agriculture, construction, mining and like industries. FIG. 4 shows implements 21A and 21B. Implement 21A is a hoppered container such as might be used to carry gravel, grain or the like with a capacity of 40,000-60,000 pounds. Implement 21B is an air seeder with folded wings with a width of 50-60 feet such as would be used in agriculture.

The implements 21 and the support frame 3 are configured such that when each implement is in the idle position, the support frame 3, schematically illustrated by phantom lines, is movable rearward with respect to each implement 21 in the idle position to an implement loading position where each implement 21 is connectable to the support frame 3 and is movable, when connected to and propelled by the towing vehicle 15, rearward with respect to each implement 21 to an implement loading position where each implement 21 is connectable to the support frame 3 and is movable to an operating position where each implement 21 is supported by the support frame 3 and is connectable to an implement control system operative to control implement functions Once an implement 21 is supported on the support frame 3 the stands 25 that support the implements 21 in the idle position are removed, folded, or retracted.

Figure 5:
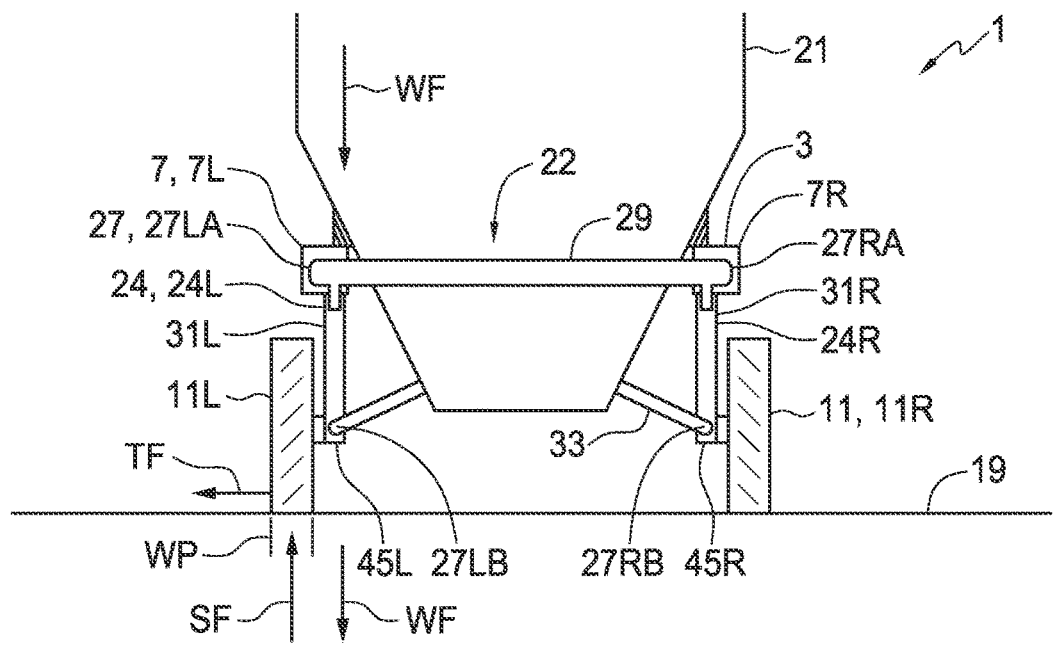
FIG. 5 is a schematic rear view of the first implement of FIG. 4 in the operating position on the support frame of FIG. 1.

FIG. 5 schematically illustrates a rear view of a typical implement 21 supported on the right and left side beams 7R, 7L of the support frame 3. The weight of the implement 21 bears against the side beams 7 along force line WF, and the weight of the rear portion of the apparatus 1 including the implement 21 and the support frame 3 is supported by the wheels 11 along support force line SF in the center of the wheel path WP. It can be seen that where the weight of the implement 21 is high, such as when the implement is configured to carry soil, gravel, grain, or the like, a significant torque force TF is exerted that will tend to move the wheels 11 outward. Further torque forces TF also occur when the apparatus 1 is operating on sloping ground, and while turning, especially at higher speeds.

To address this issue, cross members may be incorporated into the support frame 3 however it would then be necessary to configure every implement to accommodate the cross members. It would be possible to remove one cross member and substitute another for a particular implement, however this would be laborious and time consuming and so in the disclosed apparatus 1, these cross members are incorporated into each implement and attach to the support frame 3 during the loading process. Thus each implement includes the cross member support required for that particular implement in a beam lock connection 22, and the open implement area 9 remains clear.

Each of the first and second implements 21A, 21B provides a beam lock connection 22 between the right and left side beams 7R, 7L. When each of the implements 21 is in the operating position, the beam lock connection 22 resists twisting movement of the right and left side beams 7R, 7L to maintain the right and left frame wheels 11R, 11L and the right and left side beams 7R, 7L in a substantially fixed relationship with respect to each other.

The right and left side beams 7R, 7L comprise corresponding right and left beam attachment assemblies 24R, 24L, each beam attachment assembly 24 fixed to the corresponding side beam 7. The right beam attachment assembly 24R defines fixed first and second right beam attachment members 27RA, 27RB that are laterally spaced from each other in directions perpendicular to the operating travel direction T, and the left beam attachment assembly 24L defines fixed first and second left beam attachment members 27LA, 27LB that are laterally spaced from each other in directions perpendicular to the operating travel direction T, In the illustrated apparatus 1, the support frame 3 includes right and left side bars 31R, 31L rigidly attached at upper portions thereof to the corresponding right and left side beams 7R, 7L, and extending downward from the corresponding right and left side beams. The second right and left attachment members 27RB, 27LB are located at the bottom of the side bars 31 and so are spaced laterally in a vertical direction with respect to the first right and left attachment members 27RA, 27LA.

Figure 7:
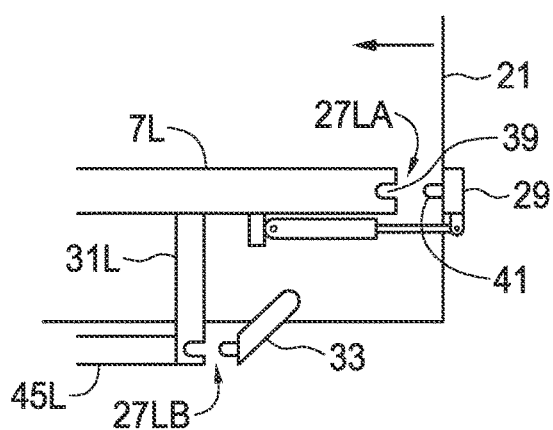
FIG. 7 is a schematic side view showing the attachment of the beam lock connection of the implement apparatus of FIG. 5.

The beam lock connection 22 comprises rigid elements 29 and 33. The illustrated elements 29, 33 form part of the implement 21 that is itself rigid such that the right and left ends of the elements 29, 33 are all rigid with respect to each other. As shown in FIG. 7 the elements 29, 33 engage the first and second right beam attachment members 27RA, 27RB and the first and second left beam attachment members 27LA, 27LB when each implement 21 is in the operating position.

Figure 6:
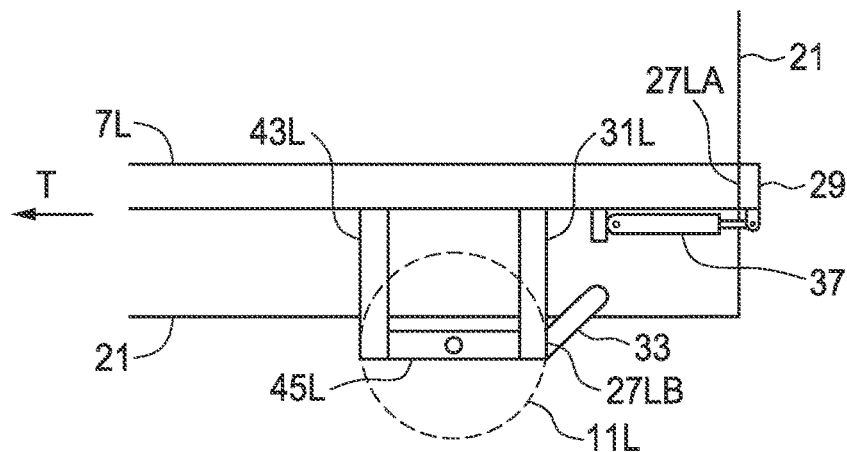
FIG. 6 is a schematic side view of the implement apparatus of FIG. 5.

Thus the beam attachment members 27RA, 27RB, 27LA, 27LB are held in a rigid relationship with respect to each other, and so the right and left frame wheels 11R, 11L and the right and left side beams 7R, 7L are maintained in a substantially fixed relationship with respect to each other and the torque forces TF are resisted whether the apparatus is operating on a level or a sloping ground surface 19. As can be seen in FIGS. 6 and 7 the first and second beam attachment members on each side are also longitudinally spaced in directions parallel to the operating travel direction T forward and rearward with respect to each other.

FIG. 6 schematically illustrates a left side view of implement 21 of FIG. 5 supported on the right and left side beams 7R, 7L of the support frame 3. The elements 29, 33 are incorporated into the implement 21 and move into engagement with the left beam attachment members 27LA, 27LB as the support frame 3 moves rearward with respect to the implement 21 in response to a force exerted by a loading hydraulic cylinder 37 as shown in FIG. 7. In the illustrated apparatus 1 the beam attachment members 27LA, 27LB comprise a recess 39 configured to receive a projection 41. The loading hydraulic cylinder 37 is operative to maintain a high forward bias force on the implement 21 to maintain the engagement during operation. Alternatively or in addition mechanical locks or latches could be provided.

In the illustrated apparatus 1, right and left front side bars 43R, 43L are rigidly attached at upper portions thereof to the corresponding right and left side beams 7R, 7L and extend downward from the corresponding right and left side beams, and the right and left rear side bars 31R, 31L are rigidly attached at upper portions thereof to the corresponding right and left side beams rearward of the corresponding right and left front side bars 43R, 43L. A right wheel support 45R is rigidly attached to lower portions of the right front and rear side bars 43R, 31R and a left 45L wheel support rigidly attached to lower portions of the left front and rear side bars 43L, 31L. The right and left frame wheels 11R, 11L are mounted to the corresponding right and left wheel supports 45R, 45L.

In the apparatus 1, the vertical distance between the first beam attachment members 27RA, 27LA and the corresponding second beam attachment members 27RB, 27LB is selected to substantially prevent movement of the right and left rear frame wheels 11R, 11L perpendicular to the operating travel direction T.

Figure 8:
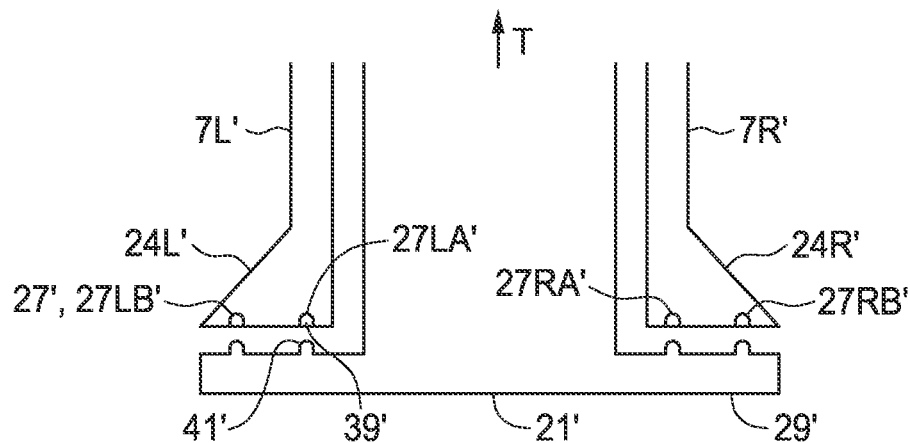
FIG. 8 is a schematic top view of an alternate support frame and implement with alternate the beam attachment assemblies and beam lock connections.

FIG. 8 schematically illustrates a version of the beam attachment assemblies 24R', 24L' with fixed corresponding beam attachment members 27RA', 27RB' and 27LA', 27LB' that are laterally spaced from each other in a horizontal direction perpendicular to the operating travel direction T, and wherein the beam lock connection 22' comprises a rigid implement portion 29' of the implement 21'. Again the beam attachment members 27' each comprise a recess 39' configured to receive a projection 41' on the rigid implement portion 29'. The beam attachment members 27' and the rigid implement portion 29' are maintained in engagement by a loading hydraulic cylinder 37 as shown in FIG. 7, or by a latch or manual lock mechanism.

Figure 9:
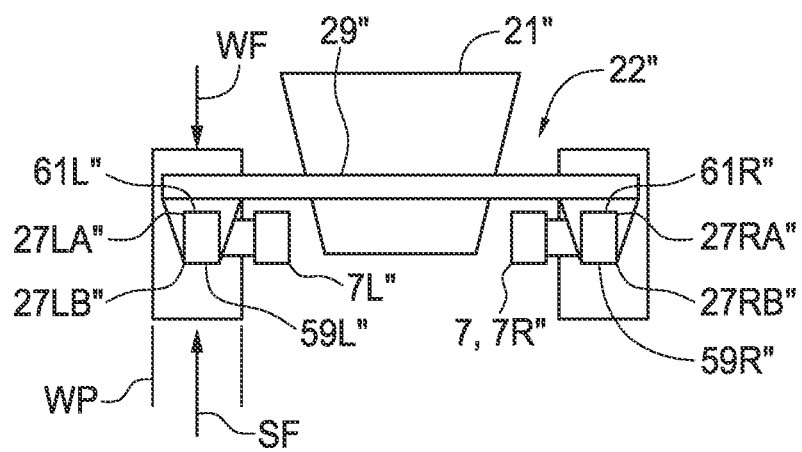
FIG. 9 is a schematic rear view of a further alternate support frame and implement with further alternate beam attachment assemblies and beam lock connections.
Figure 10:
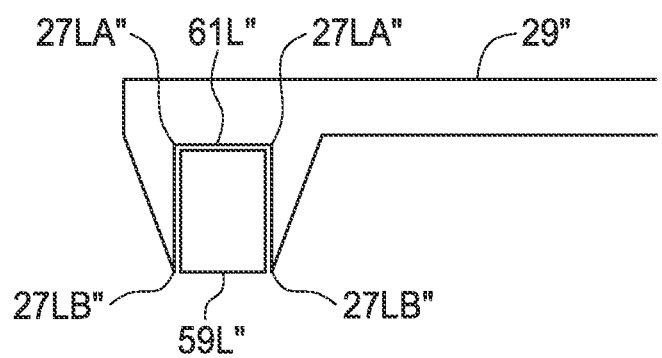
FIG. 10 is a schematic detail showing beam attachment assemblies and beam lock connection of FIG. 9.

FIGS. 9 and 10 schematic illustrate an alternate arrangement where right and left twist struts 59R", 59L" are fixed to the corresponding right and left side beams 7R", 7L", and the beam lock connection 22" comprises right and left twist slots 61R", 61L" fixed to a rigid element 29" on each implement 21", and wherein when moving from the idle position to the operating position the right and left twist slots 61" closely engage the corresponding right and left twist struts 59" to resist twisting movement of the right and left side beams 7". Here the beam attachment members 27RA", 27RB' and 27LA", 27LB' are provided by corners of the slots 61" which bear against the twist struts 59" and prevent twisting when the implement 21" is in the operating position of FIG. 9 if torque forces exert twisting forces on the side beams 7".

As schematically illustrated in FIG. 5, a torque force TF results from the weight of the implement 21 bearing against the side beams 7 along the weight force line WF that is laterally offset from support force line SF in the center of the wheel path WP of wheels 11 which support the support frame 3. This torque force TF can be removed by aligning the force line WF with the force line SF. In the arrangement of FIGS. 9 and 10, the weight of the rear portion of the implement 21" is carried through the rigid element 29" on the twist struts 59" which are aligned with the center of the wheel path WP, such that the weight force line WF and support force line SF are aligned. Such a weight distribution reduces the torque forces however the torque forces resulting from sloping terrain and turning the apparatus 1 still remain, and are resisted by the beam lock connection 22.

Figure 11:
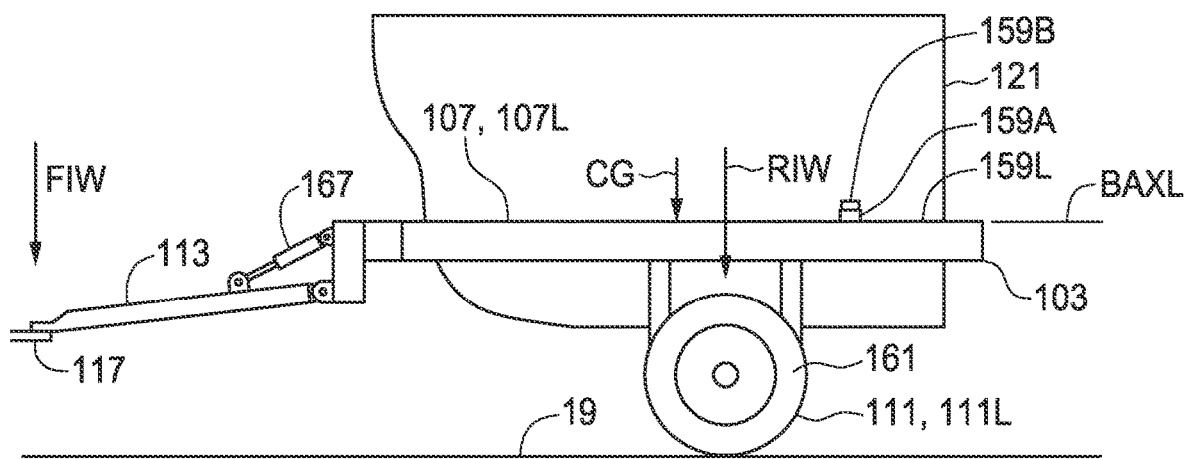
FIG. 11 is a schematic side view of an alternate support frame and implement configured to align the implement weight above portions of the frame wheel paths to reduce torque forces.
Figure 12:
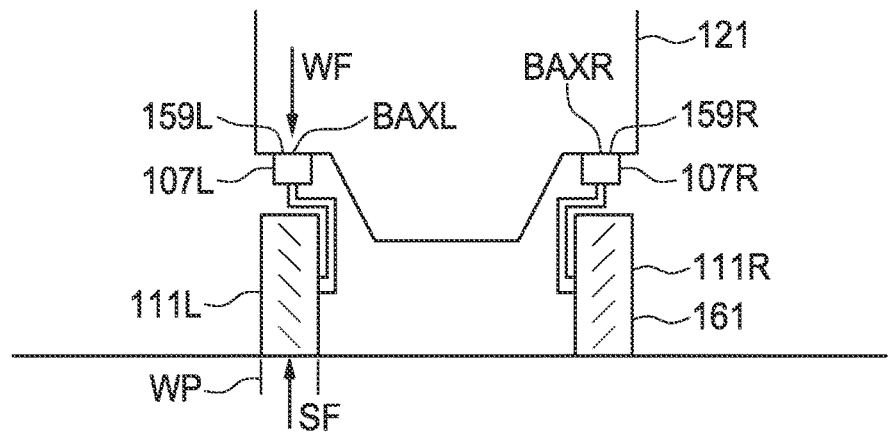
FIG. 12 is a schematic rear view of the support frame and implement of FIG. 11 where the frame wheels are directly below the side beams and the implement rests on the side beams.

FIGS. 11 and 12 schematically illustrate a support frame 103 and an implement 121 configured to align the weight force line and the support force line to reduce torque forces. When the implement 121 is in the illustrated operating position, a front FIW implement weight of the implement 21 is supported via the hitch assembly 113 on the towing vehicle hitch 117 and a rear implement weight RIW of each implement is supported on a rear portion of the support frame which is supported by frame wheels 111.

Because of the typical mounting location with a central portion of the implement 121 directly above the rear frame wheels 111, the rear implement weight RIW is significantly greater than the front implement weight FIW and the frame wheels 111 are typically quite wide, or can be dual wheels or tracks to support the high loads. The front implement weight FIW varies with the implement being carried but does provide some ballast to the tractor to increase traction of the towing vehicle wheels and reduce slippage.

To align the weight force line WF with the support force line SF, right and left rear bearing members 159R, 159L can be fixed to the corresponding right and left side beams 107R, 107L and located on right and left bearing axes BAXR, BAXL substantially aligned with the operating travel direction T and directly above paths of the right and left frame wheels 111R, 111L. Placing the right and left bearing axes BAXR, BAXL directly above the centers of the wheel path as shown is most desirable, however wheel sizes will change, dual wheels or tracks might be provided, and like options are typically present so the right and left bearing axes BAXR, BAXL will typically be above some point on the width of the frame wheel paths.

In the rear view of FIG. 12 it can be seen that the implement 121 rests directly on the side beams 107 such that the rear bearing members 159 are provided by the side beams 107, and the right and left frame wheels 111R, 111L are mounted directly under the corresponding right and left side beams 107R, 107L, and wherein the right and left rear bearing members 159 are located on the right and left side beams. In this version the whole weight of the implement 121 is carried on the side beams 107 along the right and left bearing axes BAXR, BAXL, with the side beams 107 in turn supported on the frame wheels 111 supporting the rear implement weight RIW and the hitch assembly 113 and towing vehicle hitch 117 supporting the front implement weight FIW. While the weight of the implement 121 is carried all along the length of the side beams 107, it can be seen that the approximate center gravity CG of the implement 121 will be much closer to the rear frame wheels 111 than to the vehicle hitch 117, and so most of the weight of the implement 121 is supported on the rear frame wheels 111.

To concentrate weight of the implement 121 at a desired location along the bearing axes, raised rear bearing members 159A can be provided that coincide with rear bearing points 159B on the implement 121, instead of bearing the weight of the implement along the whole length of the side beams 107. The torque forces are less problematic at front portions of the side beams, where they are rigidly fixed to the base beam 105 and twisting is resisted effectively by the base beam 105.

Figure 13:
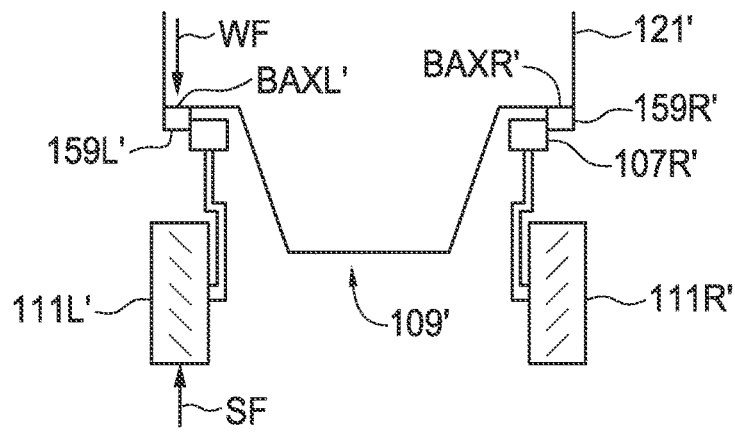
FIG. 13 is a schematic rear view of an alternate arrangement where the frame wheels are mounted laterally offset from the corresponding side beams and bearing members are rigidly fixed to the right and left side beams and extend laterally to support the implement weight above portions of the frame wheel paths.
Figure 15:
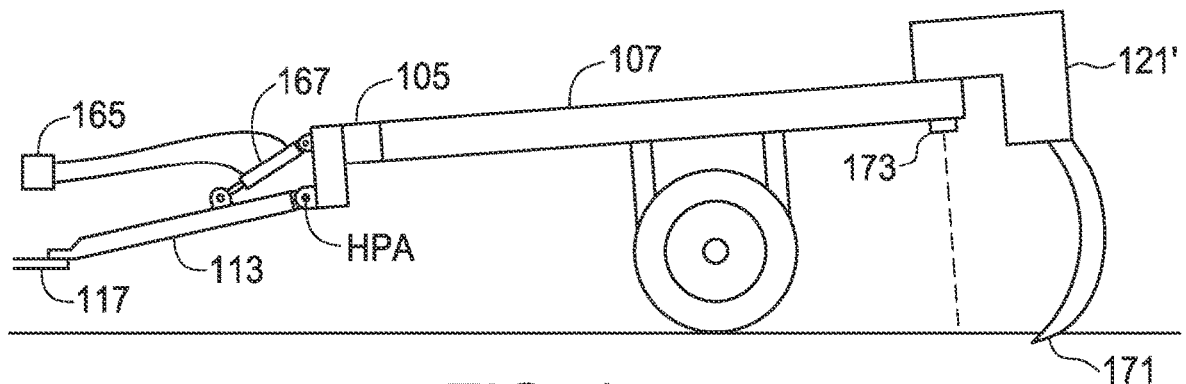
FIG. 15 is a schematic side view of the support frame of FIG. 11 with the hitch assembly in a raised position and ground engaging tools of an implement penetrating the ground to a reduced working depth.

FIG. 13 schematically illustrates an alternate arrangement configured to align the weight force line and the support force line to reduce torque forces. In the arrangement of FIG. 15, the right and left frame wheels 111R', 111L' are mounted laterally offset from the corresponding right and left side beams 107R', 107L' outside the open implement area 109' and the right and left bearing members 159R', 159L' are rigidly fixed to the right and left side beams 107R', 107L' and extend laterally to the corresponding right and left bearing axes BAXR', BAXL'.

As seen in FIG. 11 tires 161 are mounted to the frame wheels 111 and bear against the ground surface 19 to support the support frame 103.

Figure 14:
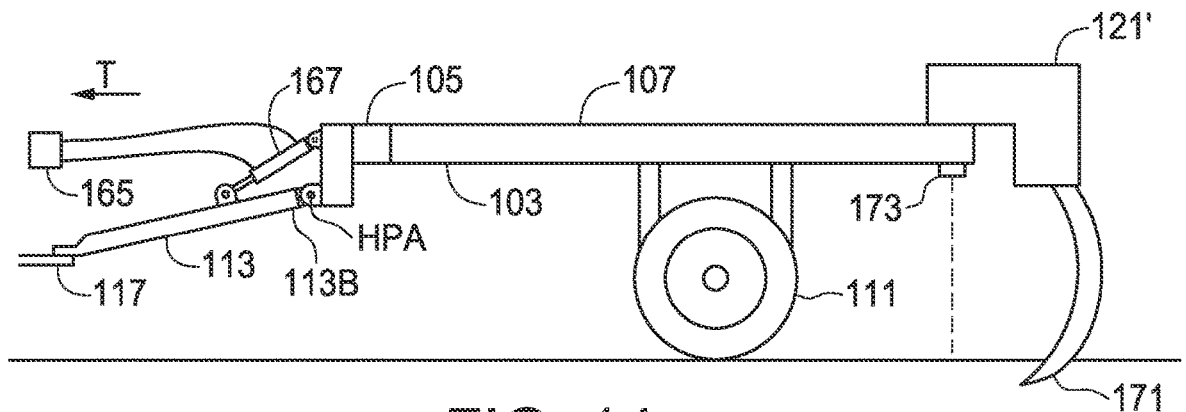
FIG. 14 is a schematic side view of the support frame of FIG. 11 with the hitch assembly in a level position and ground engaging tools of an implement penetrating the ground to a level working depth.

FIGS. 14 and 15 schematically illustrate the support frame 103 wherein the hitch assembly 113 is pivotally attached at the rear end 113B thereof to the base beam about a hitch pivot axis HPA oriented substantially horizontally and perpendicular to the operating travel direction T. A hitch hydraulic cylinder 167 is operative to pivot the hitch assembly 113 upward with respect to the base beam 105 to correspondingly move rear ends of the right and left side beams 107 upward and operative to pivot the hitch assembly downward with respect to the base beam 105 to correspondingly move the rear ends of the right and left side beams 107 downward.

FIGS. 14 and 15 schematically illustrate an implement 121' attached to the rear ends of the side beams 107 in a substantially fixed position relative to the side beams 107, such that the implement 121' moves upward and downward with the rear ends of the side beams 107. The system can be used, for example, to adjust the depth of penetration into the ground surface 19 of ground engaging tools 171 fixed to the implement 121'. An implement height sensor 173 is operative to sense a height of the implement 121', and is connected to the hydraulic source 165 for the hydraulic cylinder 167 on the towing vehicle to extend and retract the hitch hydraulic cylinder 167 to maintain the height of the implement 121' at a desired height.

Figure 16:
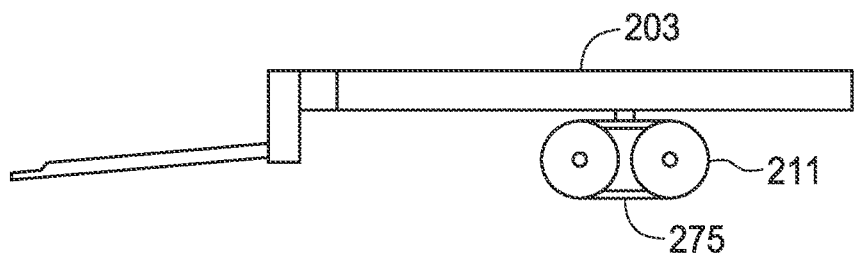
FIG. 16 is a schematic side view of a support frame supported on tracks.

FIG. 16 schematically illustrates a support frame 203 where right and left tracks 275 are connected to the corresponding tandem right and left frame wheels 211.

Figure 17:
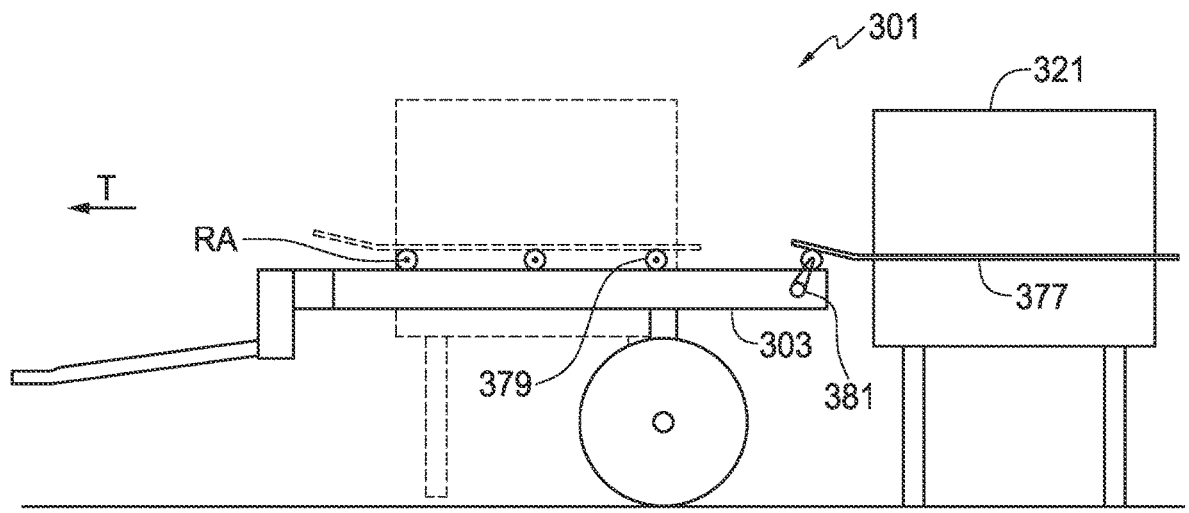
FIG. 17 is a schematic side view of an implement operating apparatus where the implement moves to the operating position on rollers.

FIG. 17 schematic illustrates an implement operating apparatus 301 wherein the implement 321 comprises right and left support plates 377 configured to rest on the support frame 303. Rollers 379 are mounted to the support frame 303 about substantially horizontal rotational axes RA oriented substantially perpendicular to the operating travel direction T. When the support frame 303 is in the implement loading position with respect to the implement 321 in the idle position illustrated in FIG. 20, the rollers 379 on each side of the support frame 303 are under the support plates 377 on each side of the implement 321, and as the support frame 303 moves rearward, the implement 321 moves toward the operating position and the rollers 379 bear against the support plates 377 and the implement 321 rolls onto the support frame 303. A roller drive 381 may be provided that is operative to selectively rotate one or more of the support rollers 379 in a forward direction to assist in moving the implement 321 to the operating position, shown in phantom lines, and in a reverse direction to move the implement 321 to the idle position.

Figure 18:
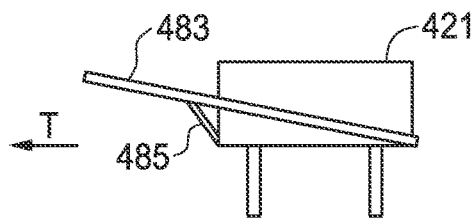
FIG. 18 is a schematic side view of an implement in the idle position where the implement has wings, and where the wings extend forward in the idle position.
Figure 19:
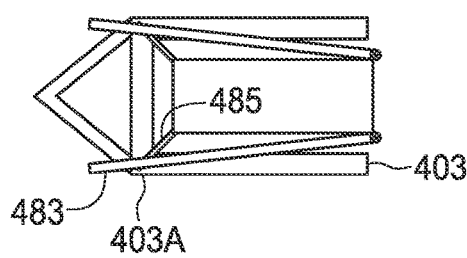
FIG. 19 is a schematic top view showing the implement of FIG. 18 in the operating position on a support frame and in a transport configuration.
Figure 20:
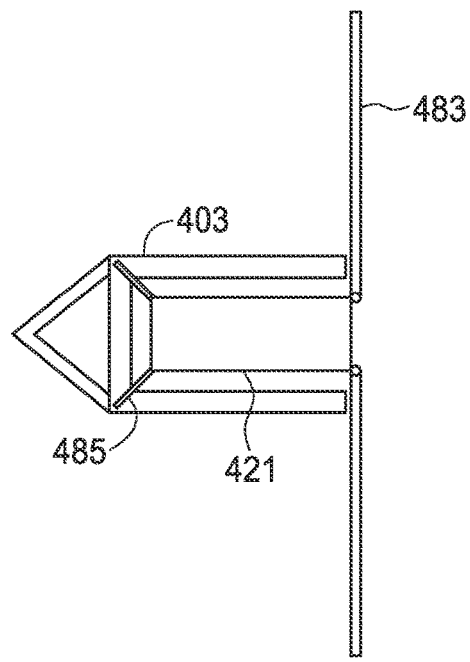
FIG. 20 is a schematic top view showing the implement of FIG. 18 in the operating position on a support frame and in an operating configuration with the wings extending laterally.

FIGS. 18-20 schematically illustrate an implement 421, such as a spraying implement, that includes right and left wings 483. The right and left wings 483 extend laterally from the support frame 403 when the implement 421 is in the operating position and in a working configuration as shown in FIG. 20, and the wings 483 extend forward substantially aligned with the operating travel direction T when the implement 421 is in a transport configuration mounted on the support frame 403 as shown in FIG. 19, and when the implement is in the idle position supported on the ground as shown in FIG. 18.

The wings 483 are supported in the forward positions of FIGS. 18 and 19 by corresponding right and left wing supports 485 attached to the implement 421. To minimize transport widths, the right and left wings 485 are above the right and left side beams 407 inside the tires, and inside outer edges 403A of the support frame 403 when in the transport configuration and mounted on the support frame 403 such that the wings are no wider than the support frame and wheels. In the illustrated support frame 403 the frame wheels are directly under the side beams of the support frame. Where the frame wheels extend laterally outside the support frame the wings in transport will be inside the outer edges of the frame wheels.

Figure 21:
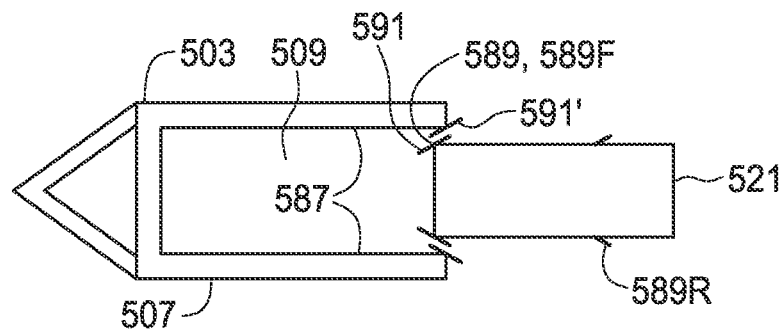
FIG. 21 is a schematic top view of a support frame and implement where the implement is guided to the operating position by rub guides bearing against rub surfaces.
Figure 22:
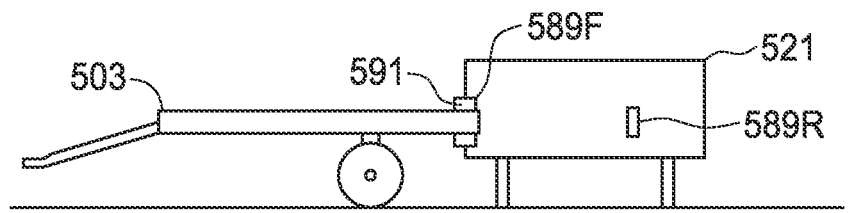
FIG. 22 is a schematic side view of the support frame and implement of FIG. 21.

FIGS. 21 and 22 schematically illustrate a support frame 503 where right and left rub faces 587 extend along right and left sides of the support frame 503. In the illustrated support frame 503 the rub faces are conveniently provided by inner faces of the corresponding right and left side beams 507. Corresponding right and left rub guides 589 are mounted on the implement 521 and the rub faces 587 and rub guides 589 are configured such that when the support frame 503 is maneuvered to the implement loading position of FIG. 21 with respect to the implement 521 in the idle position, a forward portion of the implement 521 moves into the open implement area 509 between the right and left side beams 507 and the right and left rub guides 589 contact the corresponding right and left rub faces to guide the implement 521 to the operating position.

Each rub guide 589 comprises a guide surface 591 at a front end thereof that slopes inward away from the corresponding right and left side beams 507. The illustrated implement 521 comprises right and left front rub guides 589F on a forward portion of the implement 521 and right and left rear rub guides 589R located on the implement rearward of the corresponding right and left front rub guides 589F. Sloping guide surfaces 591' could be provided on the rear ends of the side beams 507 as well.

Figure 23:
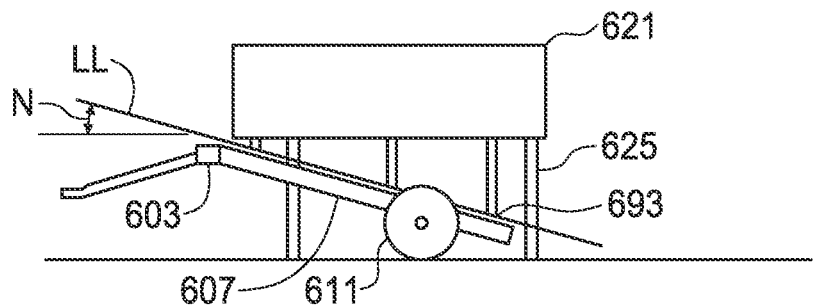
FIG. 23 is a schematic side view of a support frame where the right and left side beams slope downward from the base beam at a beam angle, and the implement comprises load points along a load line sloping downward from the forward portion of the implement at an angle substantially the same as the beam angle.

FIG. 23 schematic illustrates a support frame 603 where the right and left side beams 607 slope downward from the base beam 605 at a beam angle N, and wherein the implement 621 comprises load points 693 along a load line LL sloping downward from the forward portion of the implement at an angle substantially the same as the beam angle N The support frame 603 can then be maneuvered to the implement loading position of FIG. 23 with respect to the implement 621 in the idle position, where the side beams 607 move under the load points 693, and the jacks 625 supporting the implement in the idle position can then simply be raised to lower the implement to rest the load points 693 on the sloping side beams 607.

To accommodate the slope of the side beams 607, in the support frame 603 of FIG. 23, the right and left frame wheels 611 are mounted laterally offset from the corresponding right and left side beams 607 outside the open implement area, and the frame wheels 611 extend above the corresponding right and left side beams.

Figure 24:
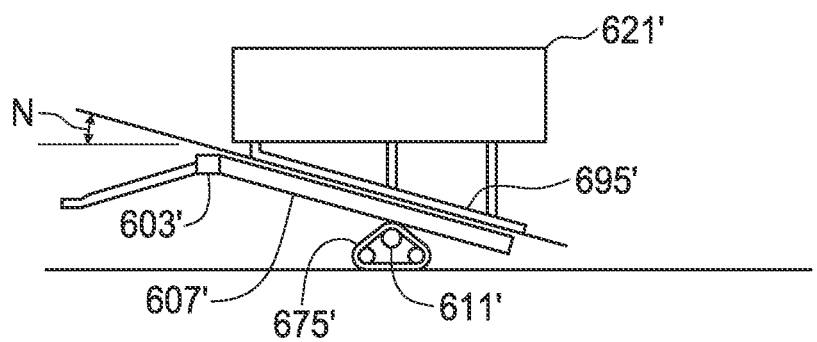
FIG. 24 is a schematic side view of an alternate support frame supported on tracks where the right and left side beams slope downward from the base beam at a beam angle, and the implement comprises a load brace sloping downward from the forward portion of the implement at an angle substantially the same as the beam angle.

An alternate arrangement of a support frame 603' is schematically illustrated in FIG. 24 where frame wheels 611' include a track 675' and are mounted directly under the corresponding right and left side beams 607'. The track arrangement allows for a lower profile drive assembly, and so can be mounted directly under the side beams 607'. FIG. 24 also illustrates an implement 621' that includes a load brace 695' extending at the beam angle N so the implement 621' is supported on the load brace 695' bearing against most of the length of the side beams 607', rather than only on the load points 693 in the arrangement of FIG. 23.

FIGS. 25-29 schematically illustrate an implement support apparatus 701 comprising a U-shaped support frame 703 comprising a base beam 705 and right and left substantially parallel side beams 707R, 707L extending rearward and sloping downward from corresponding right and left portions of the base beam 705 and defining an open implement area 709 between the right and left side beams 707.

Right and left frame wheels 711R, 711L are mounted to the corresponding right and left side beams 707R, 707L and support the side beams 707. Each frame wheel 711 is rotatable about a corresponding frame wheel axis FWA that is fixed in a substantially horizontal orientation perpendicular to an operating travel direction T that is substantially aligned with the parallel side beams 707.

A hitch assembly 713 is attached at a rear end 713B thereof to the base beam 705 and is adapted at a front end 713A thereof for connection to the hitch 717 of a towing vehicle 715.

As described above a number of different implements 721 are configured to be supported on the support frame 703 for operation. Each implement 721 is configured to perform an implement operation and to rest on the ground surface 19 when in an idle position shown in FIG. 28 supported on stands 725, and each implement 721 comprises right and left front implement load supports 702F and right and left rear implement load supports 702R. It is contemplated as well that some implements may be supported on a single front implement load support.

Figure 28:
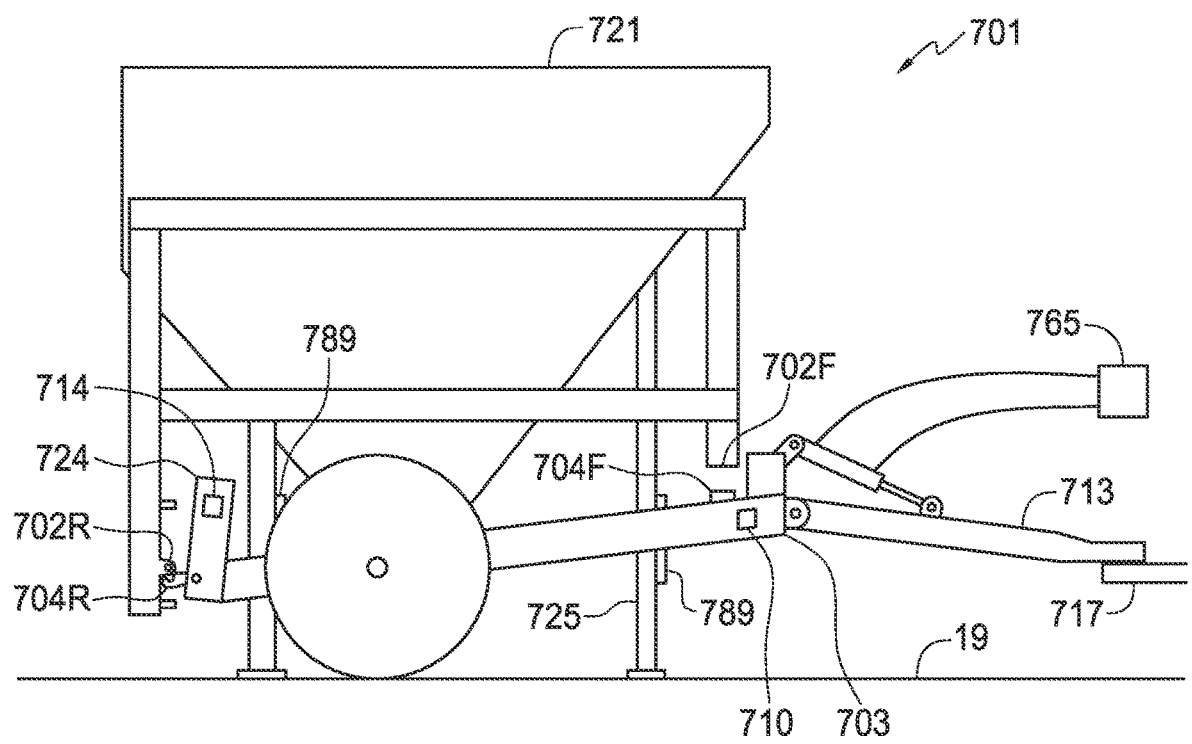
FIG. 28 is a schematic side view of the support frame of FIG. 25 in the implement loading position with respect to an implement, with the hitch assembly pivoted upward to lower the base beam
Figure 29:
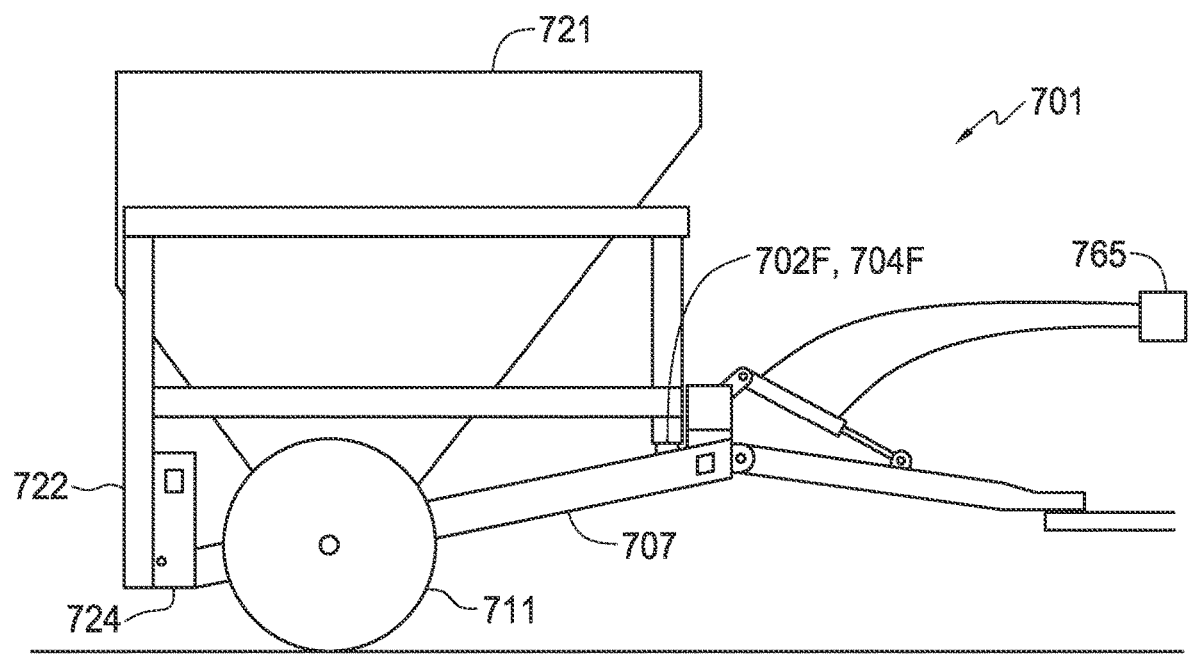
FIG. 29 is a schematic side view of the support frame and implement of FIG. 28 with the implement in the implement operating position, with the hitch assembly pivoted downward to raise the base beam and the implement.

The implement 721 and the support frame 703 are configured such that when the implement 721 is in the idle position of FIG. 28, the support frame 703 is movable rearward with respect to the implement 721 to an implement loading position shown also in FIG. 28 where the implement is connectable to the support frame 703 and is movable to an operating position shown in FIG. 29 where the implement is supported on the front implement load supports 702F and on the rear implement load supports 702R by corresponding right and left front bearing members 704F mounted to the support frame 703 and corresponding right and left rear bearing members 704R attached to the corresponding right and left side beams 707R, 707L and where the implement 721 is connected to an implement control system typically on the towing vehicle.

The right and left frame wheels 711R, 711L are mounted laterally offset from the corresponding right and left side beams 707R, 707L outside the open implement area 709, and the frame wheels 711 extend above the corresponding right and left side beams 707R, 707L such that the frame wheel axis FWA is in proximity to the side beams 707 and the rear ends of side beams 707 are comparatively close to the ground surface, about the height of a conventional tractor drawbar. Where the implement being operated includes a trailing load, such as a cultivator with ground engaging tools, the pulling force is then exerted pulling on the side beams 707 rather than exerting downward forces on the side beams 707, thus reducing stresses on the support frame 703.

Figure 25:
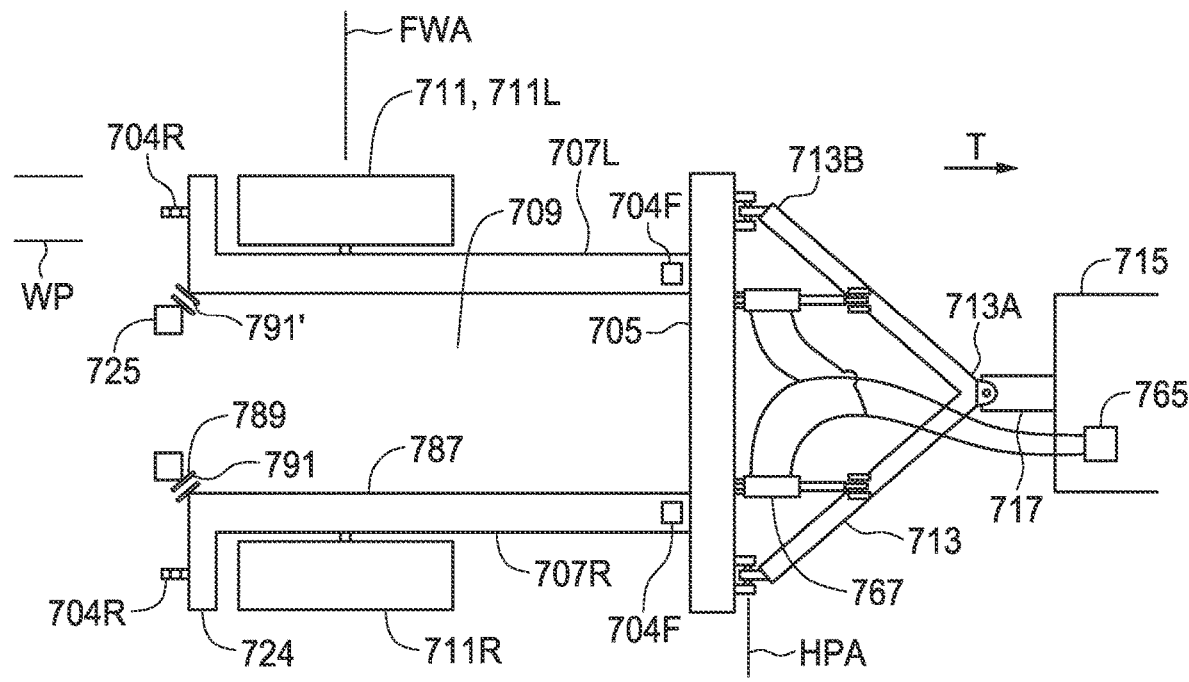
FIG. 25 is a schematic top view of an alternate support frame with downward sloping side beams, hitch hydraulic cylinders to move the hitch assembly up and down, and beam attachment assemblies attached to rear ends of the side beams directly behind the frame wheels.
Figure 26:
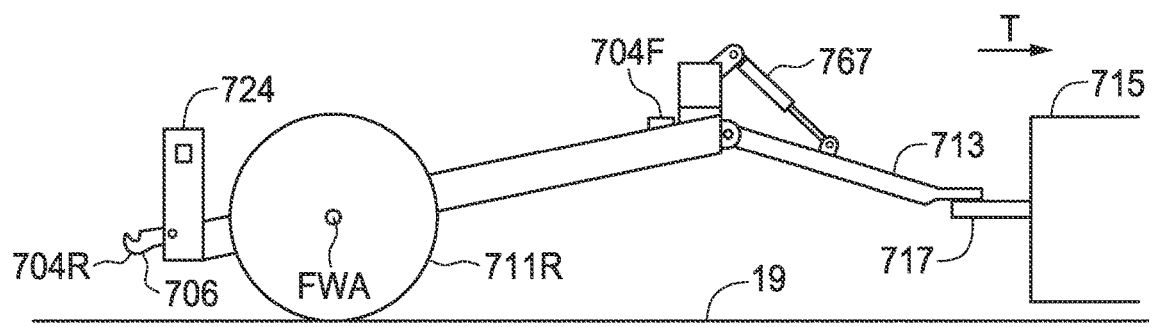
FIG. 26 is a schematic side view of the support frame of FIG. 25.
Figure 27:
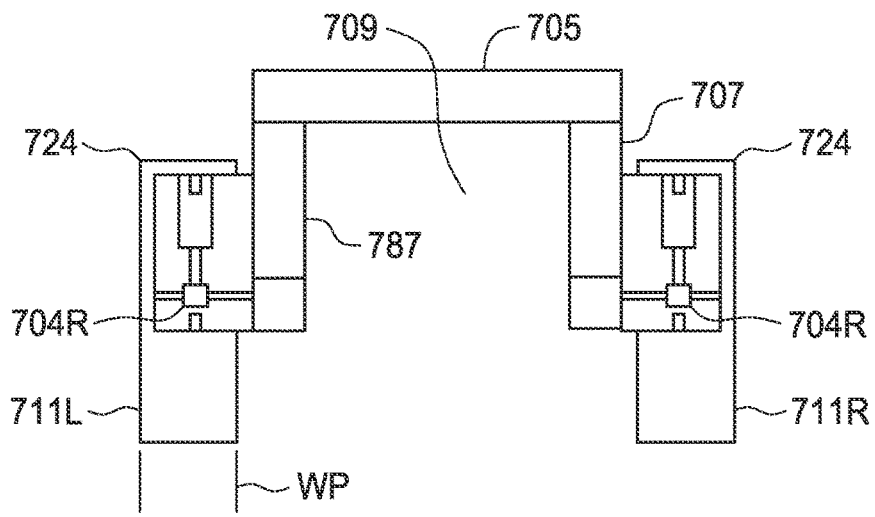
FIG. 27 is a schematic rear view of the support frame of FIG. 25.

As seen in FIGS. 25 and 26, the rear bearing members 704R are located rearward of the corresponding right and left frame wheels 711 and substantially in alignment with centers of corresponding right and left frame wheel paths WP. As discussed above however while being centered on the wheel paths WP is most desirable, wheel sizes will change, dual wheels or tracks might be provided, and like options are typically present so the rear bearing members 704R will typically be aligned some point on the width of the frame wheel paths WP.

The right and left rear bearing members 704R are provided by right and left loading arms 706 pivotally connected to corresponding right and left beam attachment assemblies 724 attached to rear ends of each side beam 707.

To further facilitate loading the implement 721 onto the support frame 703 the hitch assembly 713 is attached at the rear end 713B thereof to the base beam 705 about a hitch pivot axis HPA oriented substantially horizontally and perpendicular to the operating travel direction T. Hitch hydraulic cylinders 767 connected to hydraulic source 765 are operative to selectively pivot the hitch assembly 713 upward and downward with respect to the base beam 705 and wherein the hitch assembly 713 is pivoted upward to lower the base beam 705 while the support frame 703 is moved rearward to the implement loading position of FIG. 28, and the hitch assembly 713 is pivoted downward to raise the base beam 705 and force the front bearing members 704F upward to bear against the corresponding front implement load supports 702F and raise a front portion of each implement above the ground to the operating position of FIG. 29.

Figure 30:
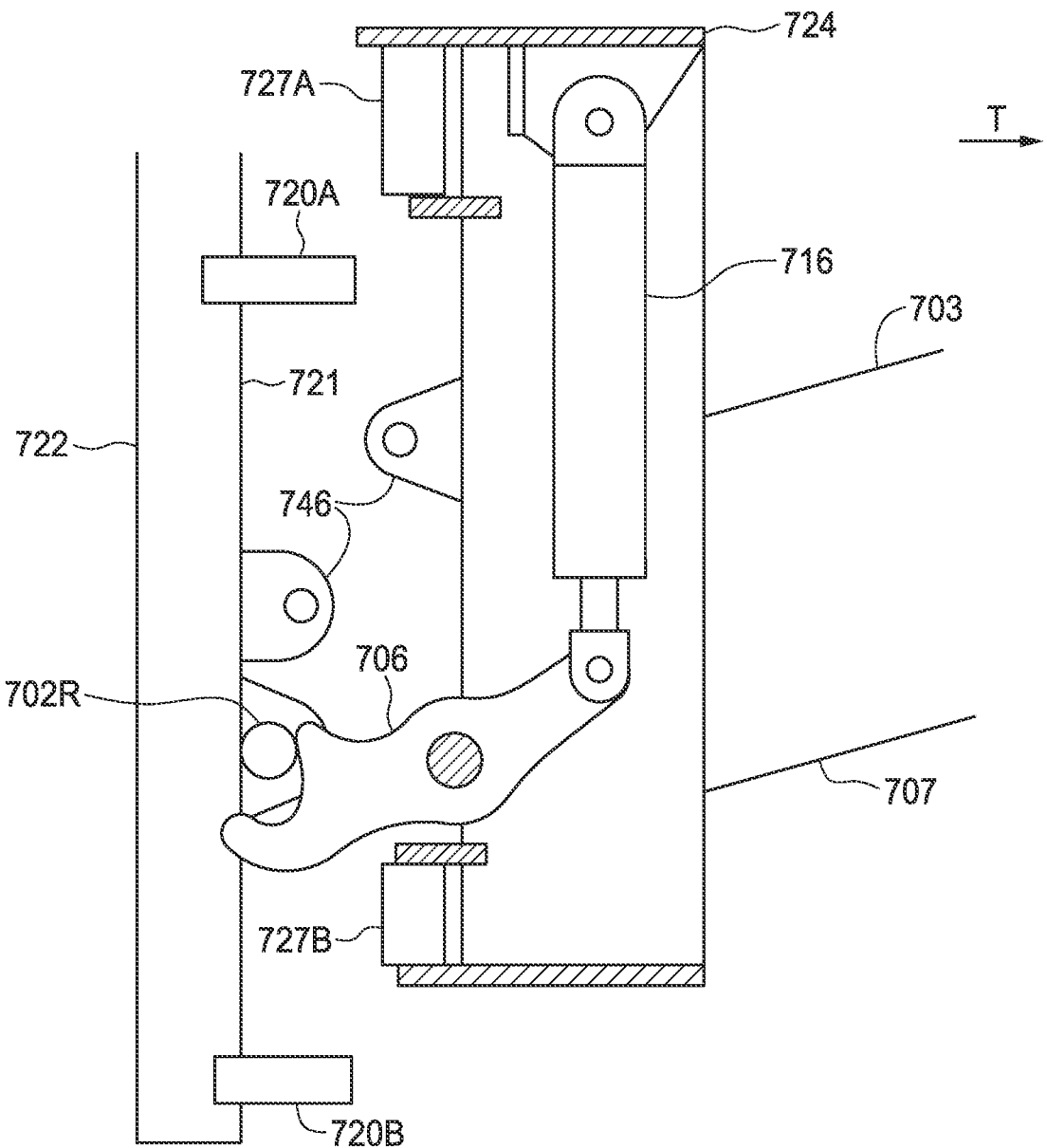
FIG. 30 is a schematic sectional side view of the beam attachment assembly and beam lock connection of the support frame and implement in the implement loading position of FIG. 28.
Figure 31:
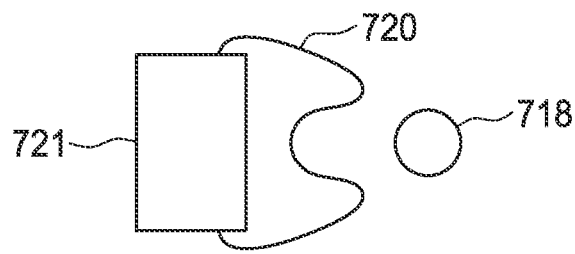
FIG. 31 is a schematic bottom view showing the relative positions of the lock plates on the implement and the pins of the beam attachment assemblies when the support frame and implement are in the implement loading position of FIG. 33.

When the support frame 703 is in the implement loading position shown in FIG. 28, each loading arm 706 engages the corresponding rear implement load support 702R on the implement 721. A further detail of the rear implement load supports 702R on the implement 721 and the beam attachment assemblies 724 on the support frame 703 in the implement loading position is shown in FIG. 30. A load control 714 is then operated to extend the load hydraulic cylinders 716 to move the loading arms 706 to the position shown in the detail illustration of FIG. 32, where the rear implement load support 702R moves upward and slightly forward from the idle position of FIG. 30, and the hitch hydraulic cylinders 767 are extended to move the base beam 705 upward and force the front bearing members 704F upward to bear against the corresponding front implement load supports 702F and raise the front portion of the implement above the ground, and so the implement 721 is moved from the idle position to the operating position, and the stands 725 can be removed or folded out of the way. The rear implement weight is carried on the load arms 706 which provide the rear bearing members 704R and which are located in portions the corresponding right and left frame wheel paths WP.

Figure 32:
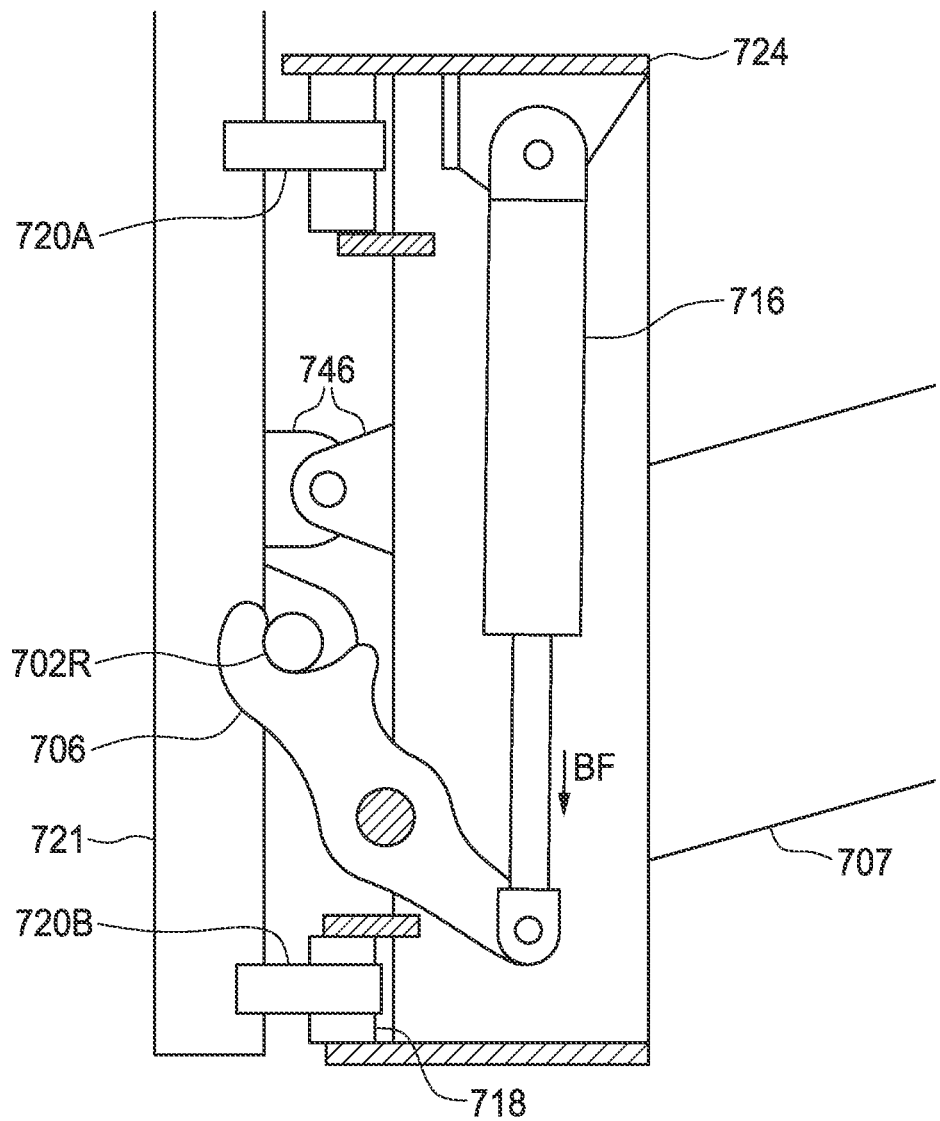
FIG. 32 is a schematic sectional side view of the beam attachment assembly and beam lock connection of the support frame and implement in the operating position of FIG. 29.
Figure 33:
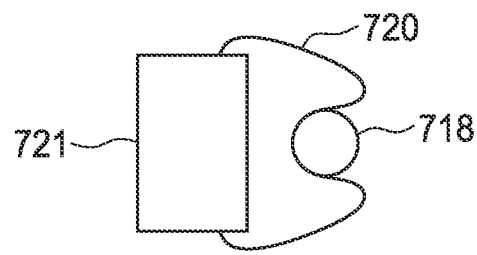
FIG. 33 is a schematic bottom view showing the relative positions of the lock plates on the implement and the pins of the beam attachment assemblies when the implement is in the operating position of FIG. 33 on the support frame.

As seen in FIGS. 30-33 each beam attachment assembly 724 defines upper and lower beam attachment members 727A, 727B in the form of pins 718 that are laterally spaced vertically from each other. The implement 721 is rigid and includes upper and lower lock plates 720A, 720B configured to engage the pins 718 of the upper and lower beam attachment members 727A, 727 on each of the right and left beam attachment assemblies 724 to prevent lateral movement of the pins 718 when the implement 721 is in the operating position, as shown in FIG. 33.

Thus it can be seen that once the implement 721 is in the operating position of FIG. 29, the load control 714 is then operated to maintain an extending pressure in the load hydraulic cylinders 716 to exert a downward bias force BF on the loading arms 706 to maintain the loading arms 706 and rear implement load supports 702R in fixed positions, and maintain the implement 721 in the operating position with the lock plates 720 engaging the pins 718 of the beam attachment members 727A, 727B and forming a beam lock connection 722 that resists twisting movement of the right and left side beams 707R, 707L to maintain the right and left frame wheels 711R, 711L and the right and left side beams 707R, 707L in a substantially fixed relationship with respect to each other. The implement 721 may be further secured to the support frame 703 by a safety pin through holes in safety plates 746 which are aligned when the implement 721 is in the operating position as shown in FIG. 32.

In addition, in the apparatus 701 the rear implement weight is supported by the right and left rear bearing members, provided by loading arms 706, that are fixed with respect to the corresponding side beams and located in portions of the wheel paths WP of the frame wheels 711. Since the rear implement weight carried on the right and left rear bearing members is at least twice, and often five or six times, as much as a front implement weight carried on the right and left front bearing members, the combination of the beam lock connection 722, which resists torque forces on the side beams 707, and the alignment of the rear implement weight in the wheel paths WP of the frame wheels 711, which reduces torque forces, significantly reduces stress on the support frame 703.

The hitch hydraulic cylinders 767 also can be used with an implement that is attached to the rear ends of the side beams 707 in a substantially fixed position to adjust the vertical position of the implement upward and downward. Also as described above, an implement height sensor can be added to the elevation control to maintain the height of the implement at a desired height.

In the support frame 703 right and left rub faces 787 extend along inner faces of the corresponding right and left side beams 707 and right and left rub guides 789 are mounted on the implement 721. In the illustrated apparatus 701 the rub guides 789 are mounted on the front and rear legs 725 supporting the implement 721 in the idle position. The rub guides 789 include a guide surface 791 at a front end thereof that slopes inward away from the corresponding right and left side beams 707.

When the support frame 703 is maneuvered to the implement loading position with respect to the implement 721 in the idle position, the front legs 725 move into the open implement area 709 between the side beams 707 and the right and left rub guides 789 contact the corresponding right and left rub faces 787 to guide the implement 721 to the operating position.

Figure 34:
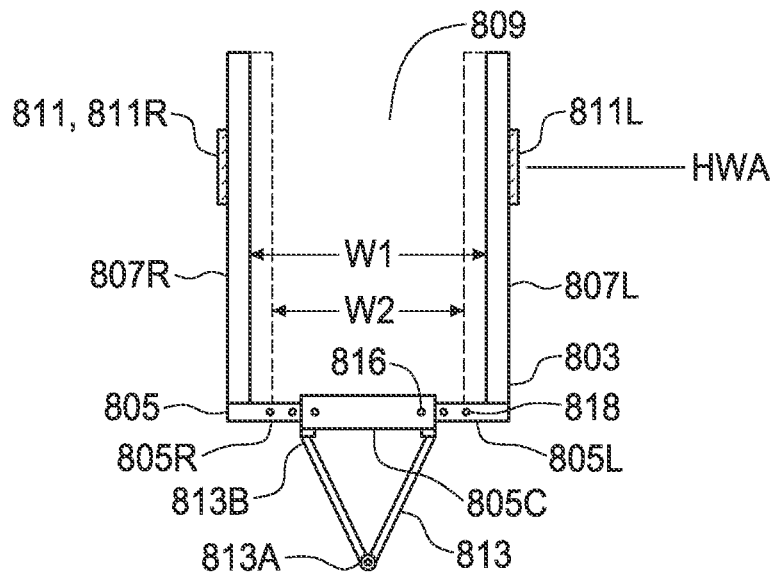
FIG. 34 is a schematic top view of an alternate support frame where the width of the open implement area between the side beams is adjustable.
Figure 35:
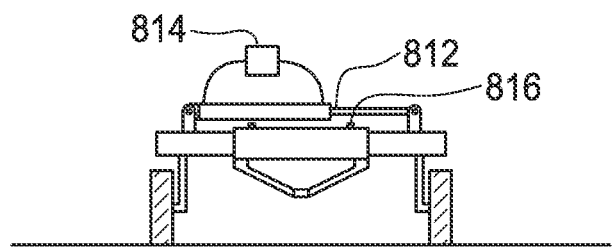
FIG. 35 is a schematic front view of the support frame of FIG. 34.
Figures 36A, 36B:
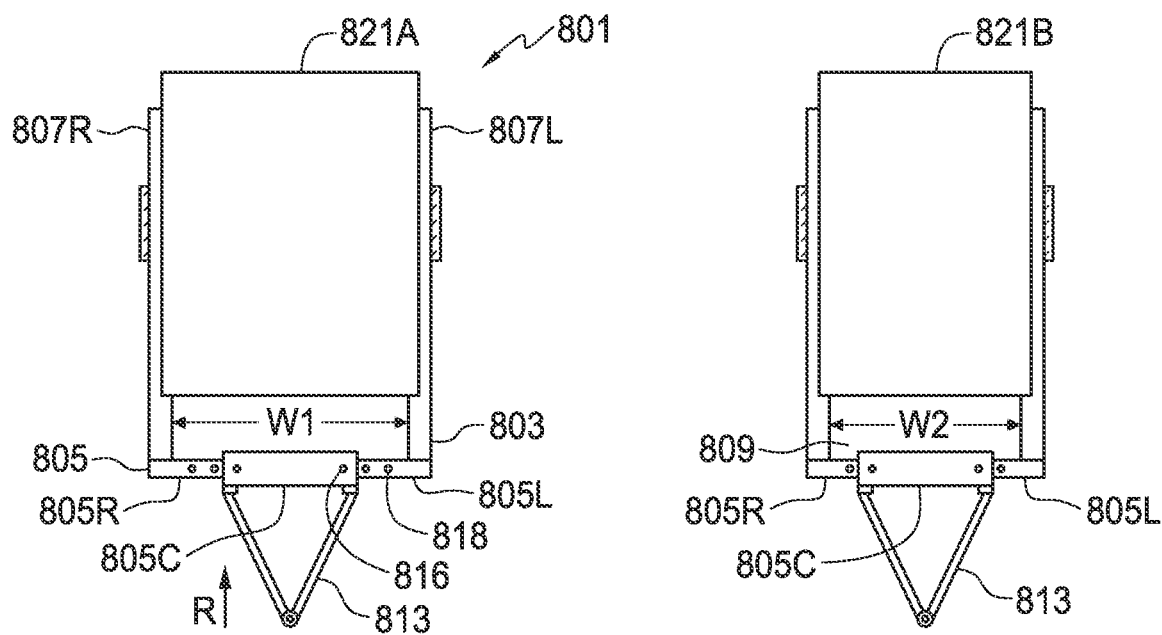
FIG. 36A is a schematic top view of the support frame of FIG. 34 with the open implement area adjusted to a first width moving rearward into the loading position with respect to a first implement.
FIG. 36B is a schematic top view of the support frame of FIG. 34 with the open implement area adjusted to a second narrower width moving rearward into the loading position with respect to a second implement.

FIGS. 34-36 schematically illustrate a further alternate implement support apparatus 801 comprising a U-shaped support frame 803 comprising a base beam 805 and right and left substantially parallel side beams 807R, 807L extending rearward from corresponding right and left portions of the base beam 805 and defining an open implement area 809 between the right and left side beams. In this support frame 803 the width W of the open implement area 809 between the side beams 807 is adjustable. FIG. 34 schematically illustrates the support frame 803 where the width of the open implement area is adjustable from a first width W1 to a second width W2.

A hitch assembly 813 is attached at a rear end 813B thereof to a front end of the support frame 803 and is adapted at a front end 813A thereof for connection to a towing vehicle as described above. Right and left frame wheels 811R, 811L are mounted to the corresponding right and left side beams 807R, 807L and support the right and left side beams. Each frame wheel 811 is rotatable about a frame wheel axis FWA that is fixed in a substantially horizontal orientation perpendicular to an operating travel direction T that is substantially aligned with the parallel side beams 807.

First and second implements 821A, 821B are each configured to perform an implement operation and to rest on the ground surface when in an idle position as schematically illustrated by implements 21A, 21B in FIG. 4.

The implements 821 and the support frame 803 are configured such that when each implement 821 is in the idle position, the support frame 803 is movable, when connected to and propelled by the towing vehicle, rearward with respect to each implement 821 to an implement loading position where each implement is connectable to the support frame 803 and is movable to an operating position where each implement 821 is supported by the support frame 803 and is connectable to an implement control system operative to control implement functions, generally as described above.

FIG. 36 schematically illustrates a top view of the apparatus 801 and implements 821 showing the support frame 803 moving in a rearward direction R toward the implement loading position with respect to each implement 821A, 821B. The width of the open implement area 809 is adjusted to the first width W1 to support the first implement 821A and the width of the open implement area 809 is adjusted to the second width W2 to support the second implement 821B.

In the illustrated support frame 803 the length of the base beam 805 is adjustable to change the width of the open implement area 809. The illustrated base beam 805 comprises a center beam segment 805C, and right and left beam segments 805R, 805L telescopically connected to corresponding right and left ends of the center beam segment 805C. In the illustrated base beam 805 inner ends of the right and left beam segments 805R, 805L slide inside corresponding right and left open ends of the center beam segment 805C. A beam fastener secures the center, right, and left beam segments at a desired location.

In the apparatus 801 the beam fastener is provided, as shown in FIG. 35, by a beam hydraulic cylinder 812 and a beam position control 814, typically connected to the towing vehicle, that is operative to extend and retract the beam hydraulic cylinder 812 to slide the right and left beam segments 805R, 805L into and out of the center beam segment 805C. Pins 816 are placed in appropriate holes 818 in the beam segments to attain the desired width of the open implement area 809. For clarity of illustration the beam hydraulic cylinder 812 is shown only in FIG. 35.

Figure 37:
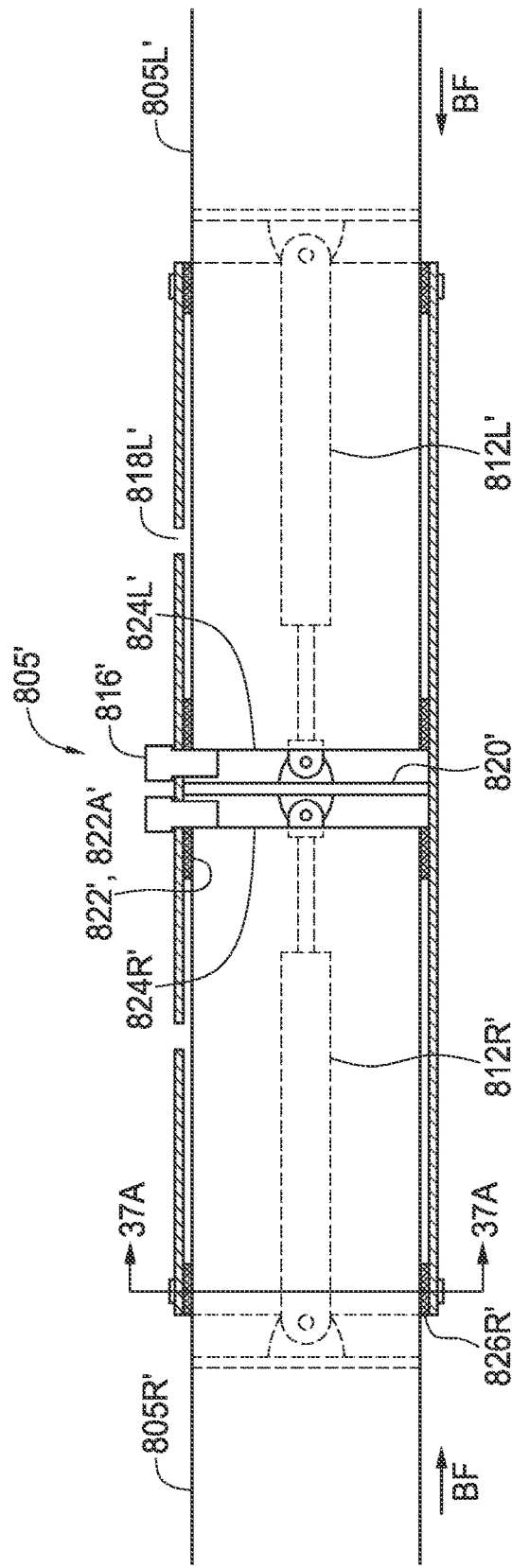
FIG. 37 is a partially cut away schematic top view an alternate base beam where two beam hydraulic cylinders are mounted inside the center beam segment, each connect to one of the right and left beam segments.

FIG. 37 schematically illustrates an alternate beam stop arrangement comprising right and left beam hydraulic cylinders 812R' and 812L'. Again inner ends of the right and left beam segments 805R', 805L' slide inside corresponding right and left open ends of the center beam segment 805C'. The top of the center beam segment 805C' has been removed to facilitate illustration. A cylinder attachment bracket 820' is fixed inside a central portion of the center beam segment 805C'. A right beam hydraulic cylinder 812R' has a first end fixed inside the right beam segment 805R' and a second end attached to the cylinder attachment bracket 820'. Similarly a left beam hydraulic cylinder 812L' has a first end fixed inside the left beam segment 805L' and a second end attached to the cylinder attachment bracket 820'.

Right and left beam stops are provided by pins 816' inserted into holes 818' selected to stop the movement of the right and left beam segments 805R', 805L' at a desired location with respect to the center beam segment 805C'. The illustrated right and left beam hydraulic cylinders 812R', 812L' are operative to exert bias forces BF on the right and left beam segments 805R', 805L' toward the 816' to provide the beam fastener.

The above beam hydraulic cylinders 812, 812R', 812L' are typically extended or retracted to change the length of the base beam 805, 805' while the support frame 803 is being towed. While frame wheels 811 are rolling the required lateral movement of the wheels 811 with respect to the ground is facilitated.

In the illustrated support frame 803 where the right and left beam segments 805R, 805L slide inside corresponding right and left open ends of the center beam segment 805B, the rear end 813B of the hitch assembly 813 is fixed to the center beam segment 805C such that the right and left beam segments can move with respect to the center beam segment without any movement of the hitch assembly 813.

Figure 38:
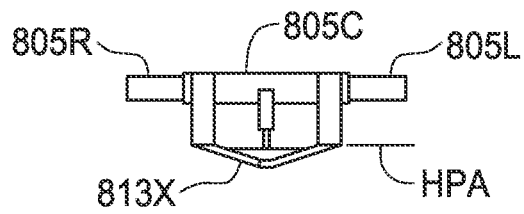
FIG. 38 is a schematic front view of a hitch assembly pivotally mounted to the center beam segment of the base beam.
Figure 39:
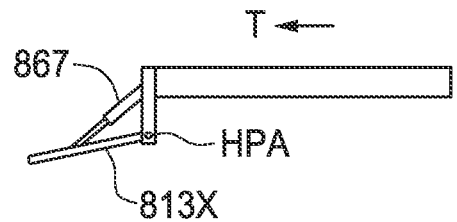
FIG. 39 is a schematic side view of the hitch assembly of FIG. 38.

Alternatively where it is desired to pivot the hitch assembly up and down, then as described above and as shown in FIGS. 38 and 39 the rear end of the hitch assembly 813X can be pivotally attached to the center beam segment 805C about a hitch pivot axis HPA oriented substantially horizontally and perpendicular to the operating travel direction T. A hitch hydraulic cylinder 867 is operative to pivot the hitch assembly 813X upward and downward with respect to the center beam segment 805.

Figure 40:
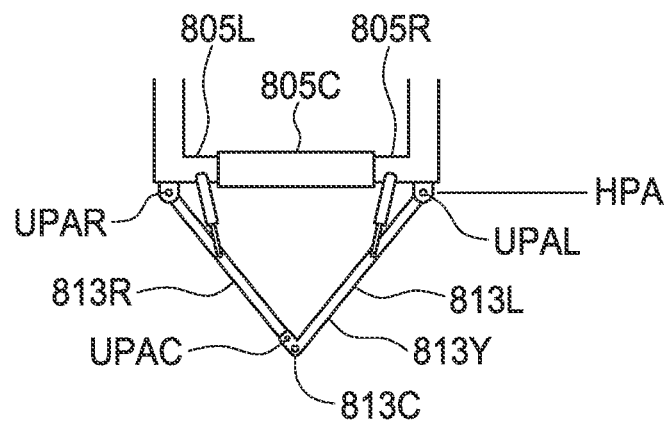
FIG. 40 is a schematic top view of an alternate hitch assembly pivotally mounted to the right and left beam segments.
Figure 41:
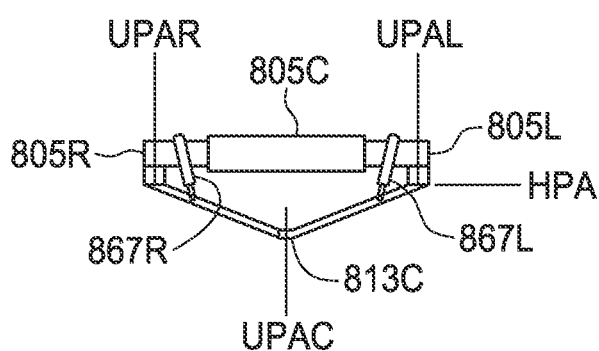
FIG. 41 is a schematic front view of the hitch assembly of FIG. 40.

Further in the alternative, as schematically illustrated in FIGS. 40 and 41, the hitch assembly 813Y can be pivotally attached to the right and left beam segments 805R, 805L about the hitch pivot axis HPA and about right and left upright pivot axes UPA.

The illustrated hitch assembly 813Y comprises a right hitch arm 813R, with a rear end pivotally attached to the right beam segment 805R about the hitch pivot axis HPA and about a right upright pivot axis UPAR. A left hitch arm 813L has a rear pivotally attached to the left beam segment 805L about the hitch pivot axis HPA, and about a left upright pivot axis UPAL. A front portion of the right hitch arm 813R is pivotally attached to a front portion of the left hitch arm 813L about a center upright pivot axis UPAC and a hitch tongue 813C is attached to the front end of the hitch assembly.

As the right and left beam segments 805R, 805L move in and out of the center beam segment 805 C, right and left hitch arms 813R, 813L pivot about the upright pivot axes UPAR, UPAL, and UPAC. Right and left hitch hydraulic cylinders 867R, 867L are operative to pivot the hitch assembly 813Y upward and downward with respect to the center beam segment 805C.

Figure 37A:
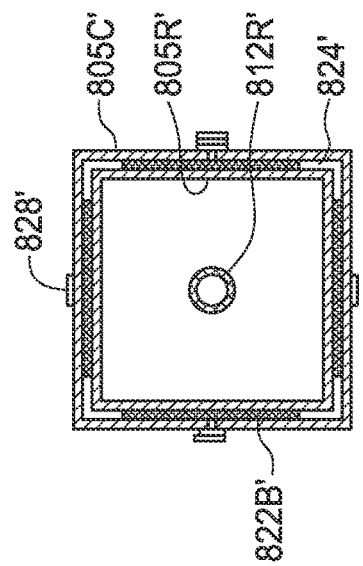
FIG. 37A is schematic sectional end view along line 37A in FIG. 37.

FIGS. 37 and 37A also illustrates low friction wear plates 822' attached to sliding surfaces of the center, right, and left beam segments 805C', 805R', 805L'. As seen in FIG. 37A the beam segments have a rectangular cross-section. First low friction wear plates 822A' are attached to outer faces of the inner ends 824R', 824L" of the right and left beam segments 805R', 805L' before inserting the inner ends of the right and left beam segments into the corresponding right and left open ends 826R', 826L' of the center beam segment 805C'. After inserting the inner ends of the right and left beam segments into the corresponding right and left open ends of the center beam segment, second low friction wear plates 822B' can slide into the gap 824' between the beam segments 805R', 805C' and be attached to inner faces of the right and left open end portions of the center beam segment with screws 828' or the like.

Figure 43:
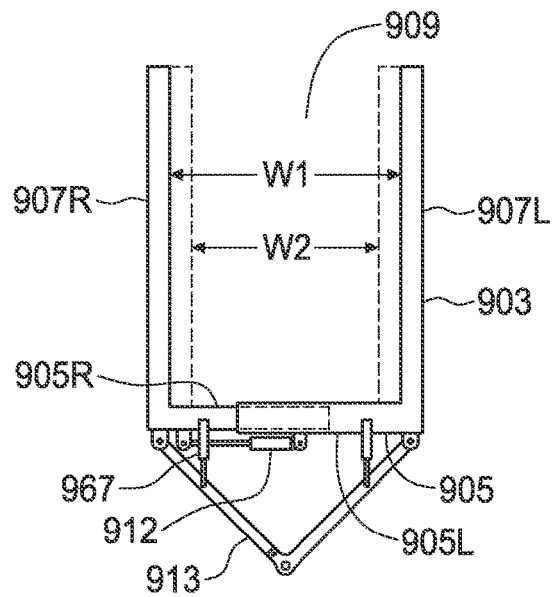
FIG. 43 is a schematic top view of an alternate support frame where right and left beam segments are fixed to corresponding right and left side beams and where the right beam segment slides telescopically into the left side beam.

FIG. 43 schematically illustrates an alternate support frame 903 where a right beam segment 905R is fixed to the right side beam 907R and a left beam segment 905L is fixed to the left side beam 907L. The right beam segment slides into the left beam segment to form the base beam 905, and the beam hydraulic cylinder 912 adjusts the length of the base beam 905 to vary the width of the open implement area 909 between width W1 and width W2.

Figure 42:
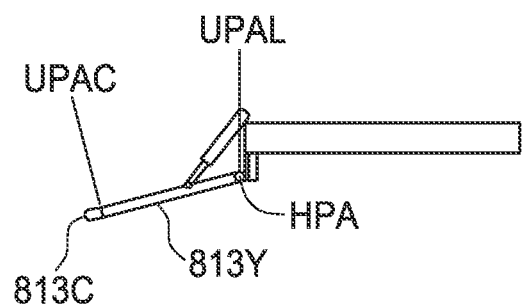
FIG. 42 is a schematic side view of the hitch assembly of FIG. 40.

The hitch assembly 913 is pivotally attached to the first and second beam segments 905R, 905L about horizontal and upright pivot axes as shown in FIGS. 40-42 and hitch hydraulic cylinders 967 pivot the hitch assembly 913 upward and downward with respect to the base beam 905. Also low friction wear plates are attached to sliding surfaces of the beam segments as described above.

Figure 44:
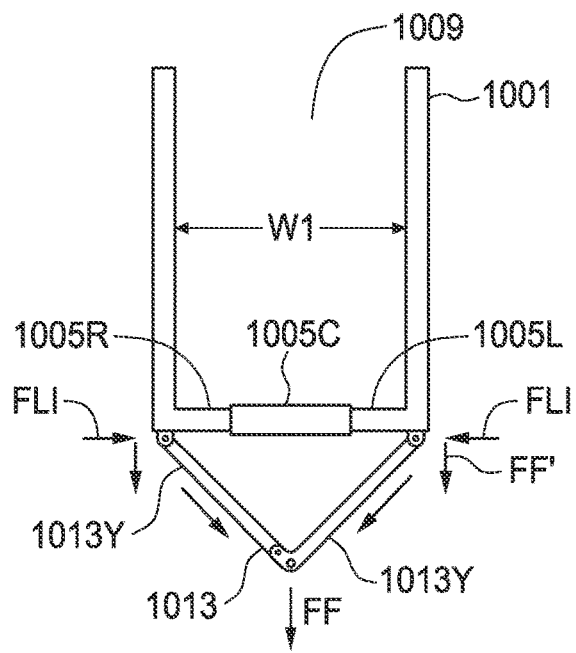
FIG. 44 is a schematic top view of an alternate support frame shown with a wide open area where the width of the open area is changed by exerting towing forces on the hitch assembly.

Although the width of the open implement area of the illustrated support frames is adjusted by using hydraulic cylinders, it is contemplated that with the hitch assemblies of FIGS. 40 and 43, where the hitch arms are attached to the relatively movable right and left beam segments, such hydraulic cylinders may not be required. As shown in FIG. 44, with any beam fasteners removed, such as any pins or locks, when the towing vehicle exerts a forward force FF on the hitch assembly 1013 of the illustrated support frame 1003, that forward force is transferred down the hitch arms 1013Y to the right and left beam segments 1005R, 1005L which each experience a forward force component FF', and also a lateral inward force component FLI which, when the support frame is moving in the forward direction, will move the right and left beam segments 1005R, 1005L into the center beam segment 1005C. Pins or stops can be configured to stop the movement at desired locations. The width of the open implement area 1009 can then be changed from the wider width W1 of FIG. 44 to the narrower width W2 of FIG. 45.

Figure 45:
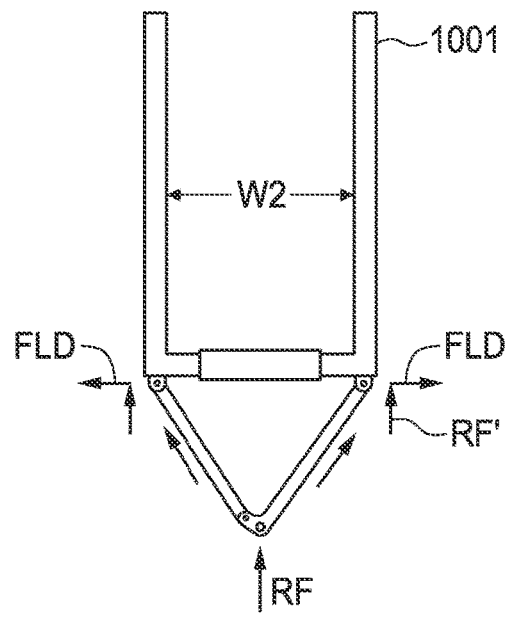
FIG. 45 is a schematic top view of the support frame of FIG. 44 with a narrower open implement area.

In a similar manner as shown in FIG. 45 when the towing vehicle exerts a rearward force RF on the hitch assembly 1013, that rearward force is transferred down the hitch arms 1013Y to the right and left beam segments 1005R, 1005L which each experience a rearward force component RF', and also a lateral outward force component FLO which, when the support frame is moving in the rearward direction, will move the right and left beam segments 1005R, 1005L out of the center beam segment 1005C. Pins or stops can be configured to stop the movement at desired locations. The width of the open implement area 1009 can then be changed from the narrower width W2 of FIG. 45 back to the wider width W1 of FIG. 44.

Varying the width of the open implement area allows the support frame to move to a narrow configuration for transport, and then to a wider stance for large implements. Implements can be configured to be transported on the support frame at the narrow width and then operated at the wider width to provide increased stability on slopes and rough terrain. The width can also be adjusted to suit a particular row crop spacing.

The present disclosure provides an implement support apparatus which includes an implement frame and hitch on wheels. The apparatus allows numerous different implements to be manufactured without a frame, hitch, or wheels, and then mounted on the support frame. Thus instead of a costly frame, hitch, and wheels for each implement, only the working parts of the implement need to be manufactured with the frame, hitch, and wheels provided by the support frame.

Heavy implement loads can be carried by the support frame because it is configured to resist torque forces caused by implement weights that are off set from the frame wheel paths and by turning and sloping ground.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An implement support apparatus comprising:
  a U-shaped support frame comprising a base beam and right and left substantially parallel side beams extending rearward from corresponding right and left portions of the base beam and defining an open implement area between the right and left side beams, and wherein a width of the open implement area between the right and left side beams is adjustable;
  right and left frame wheels mounted to the corresponding right and left side beams and supporting the right and left side beams, each frame wheel rotatable about a frame wheel axis that is fixed in a substantially horizontal orientation perpendicular to an operating travel direction that is substantially aligned with the right and left side beams;
  first and second implements, each implement configured to perform an implement operation and to rest on the ground surface when in an idle position;
  wherein the first and second implements and the support frame are configured such that when each implement is in the idle position, the support frame is movable rearward with respect to each implement to an implement loading position where each implement is connectable to the support frame and is movable to an operating position where each implement is supported by the support frame and is connectable to an implement control system operative to control implement functions; and
  wherein the width of the open implement area is adjusted to a first width to support the first implement and the width of the open implement area is adjusted to a second width to support the second implement.

2. The apparatus of claim 1 wherein a length of the base beam is adjustable to change the width of the open implement area.

3. The apparatus of claim 2 wherein the base beam comprises first and second beam segments and wherein a length of the base beam is adjusted by telescopically sliding the first beam segment into the second beam segment.

4. The apparatus of claim 3 comprising a beam hydraulic cylinder and a beam position control operative to extend and retract the beam hydraulic cylinder to slide the first beam segment into and out of the second beam segment.

5. The apparatus of claim 3 wherein the base beam comprises a center beam segment, and right and left beam segments telescopically connected to corresponding right and left ends of the center beam segment such that:
  inner ends of the right and left beam segments slide inside corresponding right and left open ends of the center beam segment; or
  right and left ends of the center beam segment slide inside corresponding open inner ends of the right and left beam segments;
  and wherein a beam fastener secures the center, right, and left beam segments at a desired location.

6. The apparatus of claim 5 wherein inner ends of the right and left beam segments slide inside corresponding right and left open ends of the center beam segment and comprising:

a cylinder attachment bracket fixed inside a central portion of the center beam segment;

a right beam hydraulic cylinder with a first end fixed inside the right beam segment and a second end attached to the cylinder attachment bracket;

a left beam hydraulic cylinder with a first end fixed inside the left beam segment and a second end attached to the cylinder attachment bracket.

7. The apparatus of claim 6 comprising beam stops configured to stop the movement of the right and left beam segments at a desired location with respect to the center beam segment.

8. The apparatus of claim 7 wherein the right and left beam hydraulic cylinders are operative to exert bias forces on the beam segments toward the beam stops to provide the beam fastener.

9. The apparatus of claim 6 comprising low friction wear plates attached to sliding surfaces of the center, right, and left beam segments.

10. The apparatus of claim 9 wherein:

the center, right, and left beam segments have a rectangular cross-section;

first low friction wear plates are attached to outer faces of the inner ends of the right and left beam segments before inserting the inner ends of the right and left beam segments into the corresponding right and left open ends of the center beam segment; and second low friction wear plates are attached to inner faces of right and left open ends of the center beam segment after inserting the inner ends of the right and left beam segments into the corresponding right and left open ends of the center beam segment.

11. The apparatus of claim 5 comprising a hitch assembly attached at a rear end thereof to a front end of the support frame and adapted at a front end thereof for connection to a towing vehicle, and wherein the inner ends of the right and left beam segments slide inside corresponding right and left open ends of the center beam segment, and wherein the rear end of the hitch assembly is either;

fixed to the center beam segment; or pivotally attached to the center beam segment about a hitch pivot axis oriented substantially horizontally and perpendicular to the operating travel direction, and wherein a hitch hydraulic cylinder is operative to pivot the hitch assembly upward and downward with respect to the center beam segment; or pivotally attached to the right and left beam segments about the hitch pivot axis and about upright pivot axes and wherein the hitch hydraulic cylinder is operative to pivot the hitch assembly upward and downward with respect to the center beam segment.

12. The apparatus of claim 5 comprising a hitch assembly attached at a rear end thereof to a front end of the support frame and adapted at a front end thereof for connection to a towing vehicle, and wherein the hitch assembly comprises:

a right hitch arm, with a rear end of the right hitch arm pivotally attached to the right beam segment about the hitch pivot axis, and about a right upright pivot axis;

a left hitch arm, with a rear end of the left hitch arm pivotally attached to the left beam segment about the hitch pivot axis, and about a left upright pivot axis;

wherein a front portion of the right hitch arm is pivotally attached to a front portion of the left hitch arm about a center upright pivot axis and a hitch tongue is attached to the front end of the hitch assembly.

13. The apparatus of claim 5 comprising a hitch assembly attached at a rear end thereof to a front end of the support frame and adapted at a front end thereof for connection to a towing vehicle, and wherein the right and left ends of the center beam segment slide inside corresponding open inner ends of the right and left beam segments, and wherein the hitch assembly is pivotally attached to the right and left beam segments about a hitch pivot axis oriented substantially horizontally and perpendicular to the operating travel direction, and about right and left upright pivot axes and wherein a hitch hydraulic cylinder is operative to pivot the hitch assembly upward and downward with respect to the center beam segment.

14. The apparatus of claim 3 comprising a hitch assembly attached at a rear end thereof to a front end of the support frame and adapted at a front end thereof for connection to a towing vehicle, and wherein the first beam segment is fixed to one of the right and left side beams and the second beam segment is fixed to the other of the right and left side beams, and wherein the hitch assembly is pivotally attached to the first and second beam segments about a hitch pivot axis oriented substantially horizontally and perpendicular to the operating travel direction, and about right and left upright pivot axes and wherein a hitch hydraulic cylinder is operative to pivot the hitch assembly upward and downward with respect to the center beam segment.

15. The apparatus of claim 14 comprising low friction wear plates attached to sliding surfaces of the beam segments.

* * * * *